United States Patent
Milne et al.

(10) Patent No.: US 9,842,411 B2
(45) Date of Patent: Dec. 12, 2017

(54) GEOMETRIC MULTIGRID ON INCOMPLETE LINEAR OCTREES FOR SIMULATING DEFORMABLE ANIMATED CHARACTERS

(71) Applicant: Disney Enterprises, Inc., Burbank, CA (US)

(72) Inventors: Andrew Milne, Los Angeles, CA (US); Rasmus Tamstorf, Los Angeles, CA (US); Alexey Stomakhin, Los Angeles, CA (US); Mark McLaughlin, Simi Valley, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 15/002,312

(22) Filed: Jan. 20, 2016

(65) Prior Publication Data

US 2016/0292902 A1    Oct. 6, 2016

Related U.S. Application Data

(60) Provisional application No. 62/142,822, filed on Apr. 3, 2015.

(51) Int. Cl.
*G06T 15/30* (2011.01)
*G06T 9/40* (2006.01)
(Continued)

(52) U.S. Cl.
CPC .............. *G06T 9/40* (2013.01); *G06T 13/00* (2013.01); *G06T 17/005* (2013.01); *G06T 19/20* (2013.01); *G06T 2219/2021* (2013.01)

(58) Field of Classification Search
None
See application file for complete search history.

(56) References Cited

U.S. PATENT DOCUMENTS 9,135,738 B2 *  9/2015  Tamstorf ............... G06T 3/0093
2010/0085357 A1 *  4/2010  Sullivan .................. G06T 15/06
                                                                            345/420

(Continued)

OTHER PUBLICATIONS

Adams et al., "Parallel multigrid smoothing: Polynomial versus Gauss-Seidel", J. Comput. Phys., 188(2), Jul. 2003, 593-610.
(Continued)

*Primary Examiner* — Xiao M. Wu
*Assistant Examiner* — Mohammad H Akhavannik
(74) *Attorney, Agent, or Firm* — Kilpatrick Townsend & Stockton LLP

(57) ABSTRACT

A method and system for simulation of deformation of elastic materials are disclosed herein. A matrix-free geometric multigrid method utilizing a direct coarse grid discretization is presented for the solution of linear systems resulting from an octree discretization of the equations of corotational linear elasticity. The diagonal component of the stiffness matrix needed for the multigrid smoother is calculated without generating the stiffness matrix. The use of an incomplete linear octree data structure supports the efficient simulation of objects with complicated boundaries. Furthermore, the method is robust to large deformations, making it suitable for character skinning applications in computer animation.

19 Claims, 13 Drawing Sheets

(51) Int. Cl.
G06T 13/00 (2011.01)
G06T 17/00 (2006.01)
G06T 19/20 (2011.01)

(56) References Cited

U.S. PATENT DOCUMENTS

2012/0281019 A1* 11/2012 Tamstorf ............... G06T 3/0093
    345/646
2015/0262416 A1* 9/2015 Hecht ..................... G06T 15/08
    345/424

OTHER PUBLICATIONS

Arbenz et al., "A scalable multi-level preconditioner for matrix-free μ-finite element analysis of human bone structures", International Journal for Numerical Methods in Engineering, 73(7), 2008, 927-947.
Baker et al., "Multigrid smoothers for ultraparallel computing", SIAM Journal on Scientific Computing, 33(5), 2011, 2864-2887.
Bank et al., "Sharp estimates for multigrid rates of convergence with general smoothing and acceleration", SIAM Journal on Numerical Analysis, 22(4), 1985, 617-633.
Baraff et al., "Large Steps in Cloth Simulation", In Proceedings of the 25th Annual Conference on Computer Graphics and Interactive Techniques, ACM, New York, NY, USA, SIGGRAPH '98, 1998, 43-54.
Baran et al., "Automatic Rigging and Animation of 3D Characters", Automatic Rigging and Animation of 3D Characters. ACM Transactions on Graphics, 26, 3, Article 72, Jul. 2007, 8 pages.
Bonet et al., "Nonlinear Continuum Mechanics for Finite Element Analysis", Cambridge University Press, Cambridge, UK, 1997.
Braun et al., "Geometrically non-linear analysis in elastodynamics using the eight-node finite element with one-point quadrature and the generalized-alpha method", Latin American Journal of Solids and Structures, 5(1), 2008, 17-45.
Bridson et al., "Robust Treatment of Collisions, Contact and Friction for Cloth Animation", ACM Trans. Graph. 21, (Jul. 3, 2002), 594-603.
Bridson et al., "Simulation of clothing with folds and wrinkles", In Proceedings of the 2003 ACM SIGGRAPH/Eurographics Symposium on Computer Animation, SCA '03, Aire-la-Ville, Switzerland, Switzerland, Eurographics Association, 2003, pp. 28-36.
Briggs et al., "A Multigrid Tutorial Second Edition", Society for Industrial and Applied Mathematics, 2000.
Burstedde et al., "p4est: Scalable algorithms for parallel adaptive mesh refinement on forests of octrees", SIAM Journal on Scientific Computing, 33(3), 2011, 1103-1133.
Capell et al., "Interactive skeleton-driven dynamic deformations", In Proc. SIGGRAPH '02, 2002, 586-593.
Capell et al., "Physically based rigging for deformable characters", In Proc. 2005 ACM SIGGRAPH/Eurographics Symp. Comput. Anim., 2005.
Capell, "Interactive Character Animation Using Dynamic Elastic Simulation", PhD thesis, University of Washington, 2004.
Chadwick et al., "Layered Construction for Deformable Animated Characters", ACM SIGGRAPH Computer Graphics—Special issue: Proceedings of the 1989 ACM SIGGRAPH conference, vol. 23, Issue 3, Jul. 1989, pp. 243-252.
Chan , "Closest-point problems simplified on the RAM", In Proceedings of the Thirteenth Annual ACM-SIAM Symposium on Discrete Algorithms, SODA '02, Philadelphia, PA, USA, Society for Industrial and Applied Mathematics, 2002, pp. 472-473.
Chao et al., "A simple geometric model for elastic deformations", ACM Trans. Graph. 29, Jul. 2010, 38:1-38:6.
Chung et al., "A time integration algorithm for structural dynamics with improved numerical dissipation: the generalized-α method", Trans. ASME J. Appl. Mech., 60(2), 1993, 371-375.

Crassin et al., "Octree-based sparse voxelization using the GPU hardware rasterizer", In Patrick Cozzi and Christophe Riccio, editors, OpenGL Insights, CRC Press, Jul. 2012, pp. 303-318.
Debunne et al., "Interactive multiresolution animation of deformable models", In Nadia Magnenat-Thalmann and Daniel Thalmann, editors, Computer Animation and Simulation '99, Eurographics, Springer Vienna, 1999, pp. 133-144.
Dick et al., "A hexahedral multigrid approach for simulating cuts in deformable objects", Visualization and Computer Graphics, IEEE Transactions on, 17(11), 2011, 1663-1675.
Dick et al., "A realtime multigrid finite hexahedra method for elasticity simulation using CUDA", Sim. Mod. Prac. Th. 19, 2, 2011, 801-816.
Douglas, "Multigrid methods in science and engineering", Computational Science Engineering, IEEE, 3(4), 1996, 55-68.
Flaig et al., "A highly scalable matrix-free multigrid solver for μFE analysis based on a pointer-less octree", In Ivan Lirkov, Svetozar Margenov, and Jerzy Waniewski, editors, Large-Scale Scientific Computing, vol. 7116 of Lecture Notes in Computer Science, Springer Berlin Heidelberg, 2012, pp. 498-506.
Galopo et al., "Soft articulated characters with fast contact handling", Comput. Graph. Forum 26, 2007, 243-253.
Georgii et al., "A multigrid framework for real-time simulation of deformable bodies", Comput. Grap. 30, 3, 2006, 408-415.
Georgii et al., "A streaming approach for sparse matrix products and its application in galerkin multigrid methods", Electronic Transactions on Numerical Analysis, 37, 2010, 263-275.
Georgii et al., "Corotated finite elements made fast and stable", In Proceedings of the 5th Workshop on Virtual Reality Interaction and Physical Simulation, 2008, pp. 11-19.
Golub et al., "Matrix Computations", Johns Hopkins University Press, Baltimore, third edition, 1996.
Grinspun et al., "CHARMS: A simple framework for adaptive simulation", In Proc. SIGGRAPH '02, 2002, pp. 281-290.
Harlow et al., "Numerical Calculation of Time-Dependent Viscous Incompressible Flow of Fluid with Free Surface", The Physics of Fluids, vol. 8, No. 12, Dec. 1965, 2182-2189.
Hellrung et al., "A second order virtual node method for elliptic problems with interfaces and irregular domains in three dimensions", J. Comput. Phys., 231(4), Feb. 2012, 2015-2048.
Huang et al., "An accurate method for voxelizing polygon meshes", In Proceedings of the 1998 IEEE Symposium on Volume Visualization, VVS '98, New York, NY, USA, 1998, pp. 119-126.
Hughes, "The Finite Element Method: Linear Static and Dynamic Finite Element Analysis", Dover Publications, Mineola, NY, 2000.
Iben et al., "Artistic simulation of curly hair", In Proceedings of the 12th ACM SIGGRAPH/Eurographics Symposium on Computer Animation, SCA '13, New York, NY, USA, 2013, pp. 63-71.
Irving et al., "Simulating the devolved: finite elements on walle", In ACM SIGGRAPH 2008 talks, ACM, New York, NY, USA, SIGGRAPH '08, 2008, 54:1-54:1.
Isaac et al., "Low-cost parallel algorithms for 2:1 octree balance", In Parallel Distributed Processing Symposium (IPDPS), 2012 IEEE 26th International, 2012, pp. 426-437.
Jacobson et al., "Skinning: Realtime shape deformation", In ACM SIGGRAPH 2014 Courses, SIGGRAPH '14, New York, NY, USA, ACM. doi:10.1145/2614028.2615427 http://skinning.org/, 2014, pp. 24:1-24:1.
Kautzman et al., "Stable, art-directable skin and flesh using biphasic materials", In ACM SIGGRAPH 2012 Talks, SIGGRAPH '12, New York, NY, USA, 2012.
Kavan et al., "Geometric skinning with approximate dual quaternion blending", ACM Trans. Graph. 27, 2008, 105:1-105:23.
Koyama et al., "Real-time example-based elastic deformation", In Proceedings of the ACM SIGGRAPH/Eurographics Symposium on Computer Animation, SCA '12, Aire-la-Ville, Switzerland, Switzerland, Eurographics Association, 2012, pp. 19-24.
Kry et al., "Eigenskin: real time large deformation character skinning in hardware", In Proc. ACM SIGGRAPH/Eurographics Symp. Comput. Anim., 2002, 153-159.
Krysl, "Natural hierarchical refinement for finite element methods", Internat. J. Numer. Methods Engrg., 56(8), 2003, 1109-1124.

(56) References Cited

OTHER PUBLICATIONS

Lewis et al., "Pose space deformation: a unified approach to shape interpolation and skeleton-driven deformation", In Proc. SIGGRAPH '00, 2000, 165-172.
Magnenat-Thalmann et al., "Joint-dependent local deformations for hand animation and object grasping", In Proc. Graph. Inter. '88, 1988, 26-33.
Martin et al., "Example-based elastic materials", ACM Trans. Graph. vol. 30 4, 2011.
McAdams et al., "A parallel multigrid Poisson solver for fluids simulation on large grids", In Proceedings of the 2010 ACM SIGGRAPH/Eurographics Symposium on Computer Animation, SCA '10, Aire-la-Ville, Switzerland, Eurographics Association, 2010, pp. 65-74.
McAdams et al., "Efficient elasticity for character skinning with contact and collisions", ACM Trans. Graph. 30, 4, Article 37, Jul. 2011, 1-12.
McLaughlin et al., "Character rigging, deformations, and simulations in film and game production", In ACM SIGGRAPH 2011 Courses, SIGGRAPH '11, New York, NY, USA, 2011, pp. 5:1-5:18.
Merry et al., "Animation Space: A Truly Linear Framework for Character Animation", ACM Trans. Graph. 25, 2006, 1400-1423.
Müller et al., "Meshless deformations based on shape matching", ACM Trans. Graph. 24, 2005, 471-478.
Müller et al., "Stable Real-Time Deformations", In Proc. 2002 ACM SIGGRAPH/Eurographics Symp. Comput. Anim., 2002, 49-54.
Müller et al., "Interactive Virtual Materials", In Proc. GI '04, 2004, 239-246.
Patterson et al., "Simulation of complex nonlinear elastic bodies using lattice deformers", ACM Trans. Graph., 31(6), Nov. 2012, 197:1-197:10.
Rivers et al., "Fastlsm: fast lattice shape matching for robust real-time deformation", ACM Trans. Graph. 26, 2007.
Sampath et al., "A parallel geometric multigrid method for finite elements on octree meshes", SIAM J. Sci. Comput., 32(3), 2010, 1361-1392.
Sampath et al., "Dendro: Parallel algorithms for multigrid and AMR methods on 2:1 balanced octrees", In Proceedings of the 2008 ACM/IEEE Conference on Supercomputing, SC '08, Piscataway, NJ, USA, 2008, pp. 18:1-18:12.
Schillinger et al., "The hp-d-adaptive finite cell method for geometrically nonlinear problems of solid mechanics", International Journal for Numerical Methods in Engineering, 89(9), 2012, 1171-1202.
Schumacher et al., "Efficient simulation of example-based materials", In Proceedings of the 11th ACM SIGGRAPH / Eurographics Conference on Computer Animation, EUROSCA'12, Aire-la-Ville, Switzerland, Eurographics Association, 2012, pp. 1-8.
Schwarz et al., "Fast parallel surface and solid voxelization on GPUs", In ACM SIGGRAPH Asia 2010 Papers, SIGGRAPH Asia '10, New York, NY, USA, 2010, pp. 179:1-179:10.
Seiler et al., "A threefold representation for the adaptive simulation of embedded deformable objects in contact", Journal of WSCG, 18(1-3), 2010, 89-96.
Shewchuk, "An introduction to the conjugate gradient method without the agonizing pain", Technical report, Carnegie Mellon University, Pittsburgh, PA, USA, 1994.
Sifakis et al., "Hybrid simulation of deformable solids", In Proc. of ACM SIGGRAPH/Eurographics Symp. on Comput. Anim., 2007, 81-90.
Sloan et al., "Shape by example", In Proc. I3D '01, 2001, 135-143.
Sueda et al., "Musculotendon simulation for hand animation", ACM Trans.Graph. 27, 3, 2008.
Sukumar et al., "Recent advances in the construction of polygonal finite element interpolants", Arch. Comput. Methods Eng., 13(1), 2006, 129-163.
Sundar et al., "Bottom-up construction and 2:1 balance refinement of linear octrees in parallel", SIAM Journal on Scientific Computing, 30(5), 2008, 2675-2708.
Sundar et al., "Low-constant parallel algorithms for finite element simulations using linear octrees", In Proceedings of the 2007 ACM/IEEE Conference on Supercomputing, 2007, 25:1-25:12.
Sundar et al., "Parallel geometric-algebraic multigrid on unstructured forests of octrees", In Proceedings of the International Conference on High Performance Computing, Networking, Storage and Analysis, SC '12, 2012, 43:1-43:11.
Sundar et al., "Comparison of multigrid algorithms for high-order continuous finite element discretizations", arXiv:1402.5938v1, Feb. 2014.
Tabarraei et al., "Adaptive computations on conforming quadtree meshes", Finite Elem. Anal. Des., 41(7-8), 2005, 686-702.
Tatebe, "The multigrid preconditioned conjugate gradient method", In N. D. Melson, T. A. Manteuffel, and S. F. McCormick, editors, Sixth Copper Mountain Conference on Multigrid Methods, vol. CP 3224, Hampton, VA, NASA, 1993, 621-634.
Teran et al., "Robust quasistatic finite elements and flesh simulation", Proc. of the 2005 ACM SIGGRAPH/Eurographics Symp. on Comput. Anim., 2005, 181-190.
Terzopoulos et al., "Physically-based facial modeling, analysis and animation", J. of Vis. and Comput. Anim. 1, 2, 1990, 73-80.
Twigg et al., "Point Cloud Glue: constraining simulations using the procrustes transform", In Proceedings of the 2010 ACM SIGGRAPH/Eurographics Symposium on Computer Animation, Eurographics Association, 2010, 45-54.
Volino et al., "Implicit midpoint integration and adaptive damping for efficient cloth simulation: Collision detection and deformable objects", Comput. Animat. Virtual Worlds, 16(3-4), Jul. 2005, 163-175.
Wang et al., "Multi-weight enveloping: least-squares approximation techniques for skin animation", In Proc. 2002 ACM SIGGRAPH/ Eurographics Symp. Comput. Anim., 2002, 169-183.
Wang, "Special bilinear quadrilateral elements for locally refined finite element grids", SIAM J. Sci. Comput., 22(6), 2000, 2029-2050.
Ward et al., "Simulating Rapunzel's hair in Disney's Tangled", In ACM SIGGRAPH 2010 Talks, SIGGRAPH '10, New York, NY, USA, 2010, pp. 22:1-22:1.
Watanabe et al., "Convergence of multigrid method for edgebased finite-element method", Magnetics, IEEE Transactions on, 39(3), May 2003, 1674-1676.
Weber et al., "A p-multigrid algorithm using cubic finite elements for efficient deformation simulation", In Jan Bender, Christian Duriez, Fabrice Jaillet, and Gabriel Zachmann, editors, Workshop on Virtual Reality Interaction and Physical Simulation, The Eurographics Association, 2014.
Wu et al., "Efficient collision detection for composite finite element simulation of cuts in deformable bodies", Vis. Comput., 29(6-8), Jun. 2013, 739-749.
Wu et al., "Multigrid integration for interactive deformable body simulation", Med. Sim. 3078, 2004, 92-104.
Zhu et al., "An efficient multigrid method for the simulation of high-resolution elastic solids", 2010, 16:1-16:18.

\* cited by examiner

GEOMETRIC MULTIGRID ON INCOMPLETE LINEAR OCTREES FOR SIMULATING DEFORMABLE ANIMATED CHARACTERS

CROSS-REFERENCES TO RELATED APPLICATIONS

This application claims priority to and the benefit of U.S. Provisional Application No. 62/142,822, filed Apr. 3, 2015 and entitled "GEOMETRIC MULTIGRID ON INCOMPLETE LINEAR OCTREES FOR SIMULATING DEFORMABLE ANIMATED CHARACTERS," the entire disclosure of which is hereby incorporated by reference.

BACKGROUND

Creating appealing characters has been one essential desire for feature animation. One challenging aspect is the production of life-like deformations for soft tissues comprising both humans and animals. In order to provide the necessary control and performance for an animator, such deformations are typically computed using a skinning technique and/or an example based interpolation method. Meanwhile, physical simulation of flesh-like material is usually avoided or relegated to an offline process due to its high computational cost. However, simulations create a range of very desirable effects, like squash-and-stretch and contact deformations. The latter is especially desirable as it can guarantee pinch-free geometry, which is important for subsequent simulations like cloth and hair.

Although the benefits of solving the equations of the underlying physical laws for character deformation are clear, computational methods are traditionally far too slow to accommodate the rapid interaction demanded by animators. Uniform grid discretizations can be computationally efficient. However, a uniform grid cannot conform to the complicated boundary of an animated character. In order to approximate the boundary of the character closely, a high-resolution grid must be used. But using such a high-resolution grid is computationally expensive and consumes large amounts of memory, making it impractical.

Accordingly, what is desired is a framework for the simulation of soft tissues that retains the efficiency of a grid discretization, while accurately approximating the boundary of the character using a non-uniform grid cell size. In order to be useful in production, any such approach must be robust to large deformations. Additionally, what is desired is to solve problems related to character skinning, some of which may be discussed herein, and reduce drawbacks related to character skinning, some of which may be discussed herein.

BRIEF SUMMARY

One aspect of the present disclosure relates to a method for deforming computer-generated objects. The method includes receiving at one or more computer systems, information identifying a computer-generated object, receiving information identifying a space partitioning tree grid that can be, for example, embedding the computer generated object or can be associated with the computer-generated object, receiving information identifying a set of material properties for the first computer generated object, and receiving kinematic information associated with the computer-generated object. Response of a continuum representation of a material can be determined at one or more cells forming the space partitioning tree grid according to the set of material properties and the kinematic information associated with the computer-generated object based on a calculated diagonal component of a stiffness matrix. In some embodiments, the stiffness matrix can be associated with a stabilized energy discretization over the one or more cells of the space partitioning tree grid utilizing a one point quadrature at each of the one or more cells. Information configured to deform the first object from a first configuration to a second configuration can be generated based on the determined response of the continuum representation of the material.

In some embodiments, the space partitioning tree grid can be an octree grid. In some embodiments, the octree grid is formed by a plurality of hexahedral cells having different sizes, and in some embodiments, each of the cells forming the octree grid has eight nodes. In some embodiments, the ratio of the edge lengths of adjacent cells may not exceed 2:1. In some embodiments, the diagonal component of the stiffness matrix is calculated without generation of the stiffness matrix. In some embodiments, the continuum representation of the material comprises a co-rotational linear model of elasticity.

In some embodiments, the method includes storing the information to deform the first object from the first configuration to the second configuration in a storage device associated with the one or more computer systems. In some embodiments, determining the response of the continuum representation of a material at one or more of the cells forming the octree grid according to the set of material properties and the kinematic information associated with the computer-generated object based on a calculated diagonal component of a stiffness matrix further includes: identifying a first cell of the octree grid having a first size, and identifying a second cell of the octree grid having a second size, which second cell is smaller than the first cell. In some embodiments, the first cell and the second cell are adjacent. In some embodiments, determining the response of the continuum representation of a material at one or more of the cells forming the octree grid according to the set of material properties and the kinematic information associated with the computer-generated object based on a calculated diagonal component of a stiffness matrix further includes identifying a hanging node of the second cell, which hanging node is at a location on the first cell but not co-located with a node of the first cell.

In some embodiments, the method includes identifying a plurality of shape functions, which shape functions are associated with each of the nodes of the second cell, generating a matrix of a derivative of the some of the shape functions associated with each of the nodes of the second cell, modifying the some of the shape functions defining the location of the hanging node of the second cell, and generating a modified matrix including a derivative of the modified some of the shape functions. In some embodiments, modifying the some of the shape functions defining the location of the hanging node of the second cell includes: identifying at least one non-hanging node of the first cell adjacent to the hanging node; determining shape functions of the at least one non-hanging node adjacent to the hanging node; and interpolating the value of the hanging node from the shape functions of the at least one non-hanging node adjacent to the hanging node. In some embodiments, the diagonal component of the stiffness matrix is calculated with the modified matrix. In some embodiments, the diagonal component is calculated as the combination of an auxiliary component and a Laplacian component.

One aspect of the present disclosure relates to a non-transitory computer-readable medium storing computer-executable code for deforming computer-generated objects. The non-transitory computer-readable medium includes: code for receiving at one or more computer systems, information identifying a computer-generated object, code for receiving information identifying a space partitioning tree grid that can be, for example, embedding the computer generated object or can be associated with the computer-generated object, code for receiving information identifying a set of material properties for the first computer generated object, code for receiving kinematic information associated with the computer-generated object, code for determining a response of a continuum representation of a material at one or more cells forming the space partitioning tree grid according to the set of material properties and the kinematic information associated with the computer-generated object based on a calculated diagonal component of a stiffness matrix. In some embodiments, the stiffness matrix can be associated with a stabilized energy discretization over one or more cells of the space partitioning tree grid utilizing a one point quadrature at each of the one or more cells. The non-transitory computer-readable medium includes: code for generating information to deform the first object from a first configuration to a second configuration based on the determined response of the continuum representation of the material. In some embodiments, this information can be based on the determined response of the continuum representation of the material.

In some embodiments, the space partitioning tree grid is an octree grid. In some embodiments, the octree grid is formed by a plurality of hexahedral cells having different sizes, and in some embodiments, each of the cells forming the octree grid has eight nodes. In some embodiments, the ratio of the edge lengths of adjacent cells may not exceed 2:1. In some embodiments, the diagonal component of the stiffness matrix is calculated without generation of the stiffness matrix. In some embodiments, the continuum representation of the material comprises a co-rotational linear model of elasticity. In some embodiments, the non-transitory computer-readable medium of includes comprising code for storing the information configured to deform the first object from the first configuration to the second configuration in a storage device associated with the one or more computer systems.

In some embodiments, determining the response of the continuum representation of a material at one or more of the cells forming the octree grid according to the set of material properties and the kinematic information associated with the computer-generated object based on a calculated diagonal component of a stiffness matrix includes: identifying a first cell of the octree grid having a first size, and identifying a second cell of the octree grid having a second size, which second cell is smaller than the first cell. In some embodiments, the first cell and the second cell are adjacent. In some embodiments, determining the response of the continuum representation of a material at one or more of the cells forming the octree grid according to the set of material properties and the kinematic information associated with the computer-generated object based on a calculated diagonal component of a stiffness matrix includes identifying a hanging node of the second cell, which hanging node is at a location on the first cell but not co-located with a node of the first cell.

In some embodiments, the non-transitory computer-readable medium further includes: code for identifying a plurality of shape functions; some of which plurality of shape functions are associated with each of the nodes of the second cell, code for generating a matrix of a derivative of the some of the shape functions associated with each of the nodes of the second cell, code for modifying the some of the shape functions defining the location of the hanging node of the second cell, and code for generating a modified matrix including a derivative of the modified some of the shape functions. In some embodiments, modifying the some of the shape functions defining the location of the hanging node of the second cell includes: identifying at least one non-hanging node of the first cell adjacent to the hanging node; determining shape functions of the at least one non-hanging node adjacent to the hanging node; and interpolating the value of the hanging node from the shape functions of the at least one non-hanging node adjacent to the hanging node. In some embodiments, the diagonal component of the stiffness matrix is calculated with the modified matrix, and in some embodiments, the diagonal component is calculated as the combination of an auxiliary component and a Laplacian component.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

Introduction

Whereas previous works have addressed many of the concerns related to efficiency, non-uniform grid cell sizes, and robustness to large deformations individually, a novel algorithmic framework is disclosed for the simulation of soft tissues (e.g., hyperelastic tissues) that targets all of these concerns in various aspects. A production system for physics-based skinning of skeletally driven characters is provided that is utilizes an adaptive octree discretization. An adaptive discretization both improves performance and decreases memory usage, by adding resolution only where needed. To support domains with complicated boundaries, such as animated characters, the object is embedded an incomplete octree, which may be refined around the boundary. For efficiency, a linear, pointerless octree encoding is used. A matrix-free geometric multigrid method utilizing a direct coarse grid discretization is presented for the solution of linear systems resulting from an octree discretization of the equations of corotational linear elasticity. The use of exact force differentials for corotational linear elasticity makes the method more robust to large deformations than solvers that use the simpler warped stiffness formulation, while a stabilized one-point quadrature keeps it efficient. The diagonal component of the stiffness matrix needed for the multigrid smoother is calculated without generating the stiffness matrix.

System Overview

Figure 1:
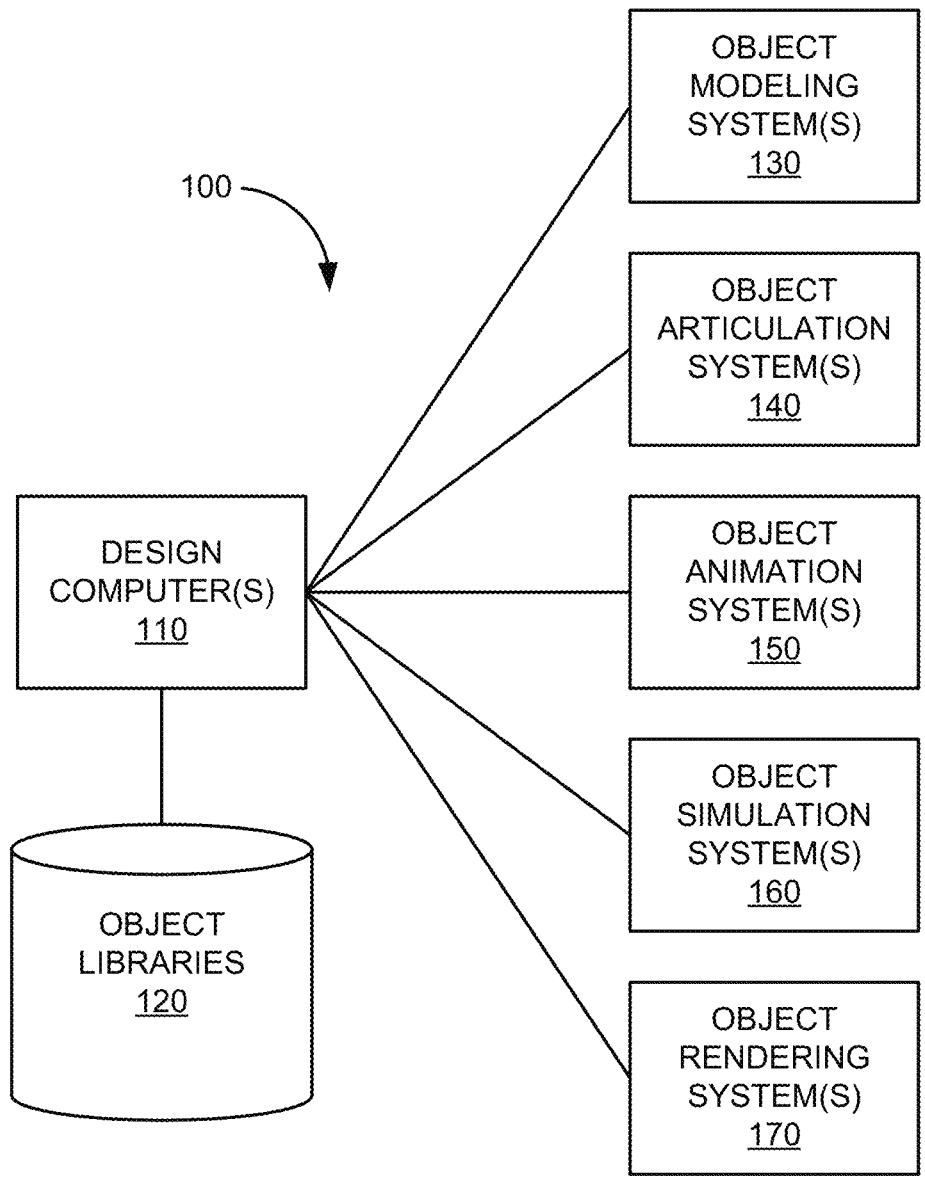
FIG. 1 is a simplified block diagram of a system for creating computer graphics imagery (CGI) and computer-aided animation that may implement or incorporate various embodiments or techniques for simulating deformation.

FIG. 1 is a simplified block diagram of system 100 for creating computer graphics imagery (CGI) and computer-aided animation that may implement or incorporate various embodiments or techniques for efficient elasticity for character skinning. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air; shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency, diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image.

In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170 that provide one or more tools for efficient elasticity for character skinning.

Skeleton Driven Skin Deformation and Octrees

Skeleton driven skin deformation was first introduced by [Magnenat-Thalmann et al. 1988]. Since then such techniques have been used extensively, especially the "linear blend skinning" technique (aka. "skeleton subspace deformation" (SSD) or "enveloping"). However, the limitations of such techniques are well-known and have been the topic of numerous papers [Wang and Phillips 2002; Merry et al. 2006; Kavan et al. 2008]. Despite improvements, skinning remains, for the most part purely kinematic. It has proven very difficult to get more accurate, physically based deformations (e.g., from self-collisions and contact with other objects).

Instead, such phenomena are typically created through a variety of example based approaches [Lewis et al. 2000; Sloan et al. 2001]. Although example based methods are computationally cheap, they often require extreme amounts of user input, especially for contact and collision. Recently, authors have also considered automatic means of fitting skeletons and binding their movement to deformation as in [Baran and Popović 2007].

Simulation recently enabled significant advances to character realism in [Irving et al. 2008] and [Clutterbuck and Jacobs 2010], albeit with the luxury of extreme computation time. Nevertheless, these approaches demonstrated the promise of simulation. Many techniques reduce the accuracy of an elasticity model being simulated to help improve performance and interactivity. For example, [Terzopoulos and Waters 1990; Chadwick et al. 1989] first demonstrated the effectiveness of comparatively simple mass/spring based approaches. [Sueda et al. 2008] added interesting anatomic detail using the tendons and bones in the hand, but used simple surface-based skin. [Shi et al. 2008] used simplified surface-based spring forces to provide dynamics given an example skeleton and deformed poses. [Kry et al. 2002] used principle component analysis of off-line elasticity simulation to provide interactive physically based SSD. [Capell et al. 2005; Capell et al. 2002; Galopo et al. 2007] used a skeleton based local rotational model of simple linear elasticity. [Müller et al. 2005] introduced shape matching, a technique that uses quadratic modal elements defined per lattice cell, allowing realtime albeit less accurate deformations. [Rivers and James 2007] extended the accuracy of the shape matching method while maintaining high performance with a fast SVD.

Warped stiffness approaches [Müller et al. 2002; Müller and Gross 2004; Müller et al. 2004] are a more general example of the above techniques developed by Cappel et al. and use an inexact force differential to yield easily solvable symmetric positive definite (SPD) linearizations. However, [Chao et al. 2010] recently demonstrated the importance of a more accurate approximation to rotational force differentials lacking in warped stiffness approaches. The instability of the method hinders its use in skinning applications. Unfortunately, the more accurate linearizations yield indefinite systems and thus require more expensive linear algebra techniques (e.g., GMRES).

Typically elastic simulation requires the solution of large sparse systems. Conjugate gradients is one popular method for solving such systems by virtue of simplicity and low-memory overhead. However, the method is plagued by slow convergence (especially with high resolution models). Multigrid techniques potentially avoid these convergence issues, but can be costly to derive for problems over irregular domains. [Zhu et al. 2010] developed a multigrid approach that achieves nearly optimal convergence properties for incompressible materials on irregular domains. Yet, their technique for corotational elasticity uses a pseudo-Newton iteration that does not guarantee convergence on the large deformations typical in skeleton driven animation. [Dick et al. 2011b; Georgii and Westermann 2006; Wu and Tendick 2004] also examine multigrid methods for rapidly solving the equations of corotational elasticity. Again, these techniques are based on the warped stiffness approximation to corotational force differentials and demonstrate similar convergence issues as Zhu et al.

[McAdams et al. 2011] developed a multigrid method for a stabilized one-point quadrature discretization of corotational elasticity on irregular domains that utilizes exact force differentials and enforces the positive definiteness of the stiffness matrix. However, this method operates on uniform hexahedral grids. It is completely matrix-free due to the use of a direct coarse grid discretization. In contrast, multigrid methods based on Galerkin coarsening such as [Dick et al. 2011a] stores a sparse matrix on each multigrid level, which requires several times more memory. In addition, Galerkin coarsening requires computing matrix-matrix products. These computations are memory-bandwidth-limited. [Georgii and Westermann 2010] introduced an algorithm for speeding up these computations, at the expense of even greater memory usage.

Octrees avoid the restrictions of a uniform grid. Linear octree data structures are very efficient [Sundar et al. 2007; Sundar et al. 2008; Sampath et al. 2008; Sampath and Biros 2010; Isaac et al. 2012]. However, these authors required their domains to be topological cubes and used complete linear octrees. In order to support more complicated domains, [Sundar et al. 2012; Burstedde et al. 2011; Isaac et al. 2012] used forests of octrees, which requires partitioning the domain into an irregular macro mesh. [Flaig and Arbenz 2012] used a similar linear data structure, but embedded the domain into an incomplete uniform grid and omitted the empty cells. None of these works addressed corotational linear elasticity. [Dick et al. 2011a; Seiler et al. 2010] solved corotational linear elasticity on incomplete octrees, using the less robust warped stiffness formulation.

Octrees contain "hanging nodes" or "T-vertices" in the middle of edges and faces where smaller elements are adjacent to larger elements. These must be carefully handled in order to enforce the continuity of the solution between elements of different sizes. [Gupta 1978; Tabarraei and Sukumar 2005; Sukumar and Malsch 2006] modified the shape functions of the larger element to incorporate the hanging nodes. [Wang 2000a; Wang 2000b; Sundar et al. 2007; Sifakis et a. 2007; Dick et al. 2011a] effectively modified the shape functions of the smaller elements by replacing the hanging nodes with nonhanging nodes from the adjacent larger element. Rather than handling the hanging nodes specially, [Sundar et al. 2012; Burstedde et al. 2011] used discontinuous Galerkin methods. [Grinspun et a. 2002; Krysl et a. 2003] refined shape functions in a manner that avoids introducing hanging nodes in the first place.

Elasticity and Discretization

A novel corotational elasticity discretization is disclosed that meets one or more of the demands for high-resolution simulation with optimal performance and robustness. Following [Chao et al. 2010], an accurate treatment of force derivatives is used to yield a more robust solver than those of simplified warped-stiffness techniques. These careful linearizations can be done both cheaply and simply.

In various embodiments, a discretization is performed over a structure, which structure can be uniform (e.g., a hexahedral lattice) or non-uniform, rather than an unstructured tetrahedral one to facilitate performance on modern hardware. Whereas most standard methods for hexahedra require 8 point Gauss quadrature per cell for stability, in various embodiments, a one-point quadrature discretization is provided.

Figure 2:
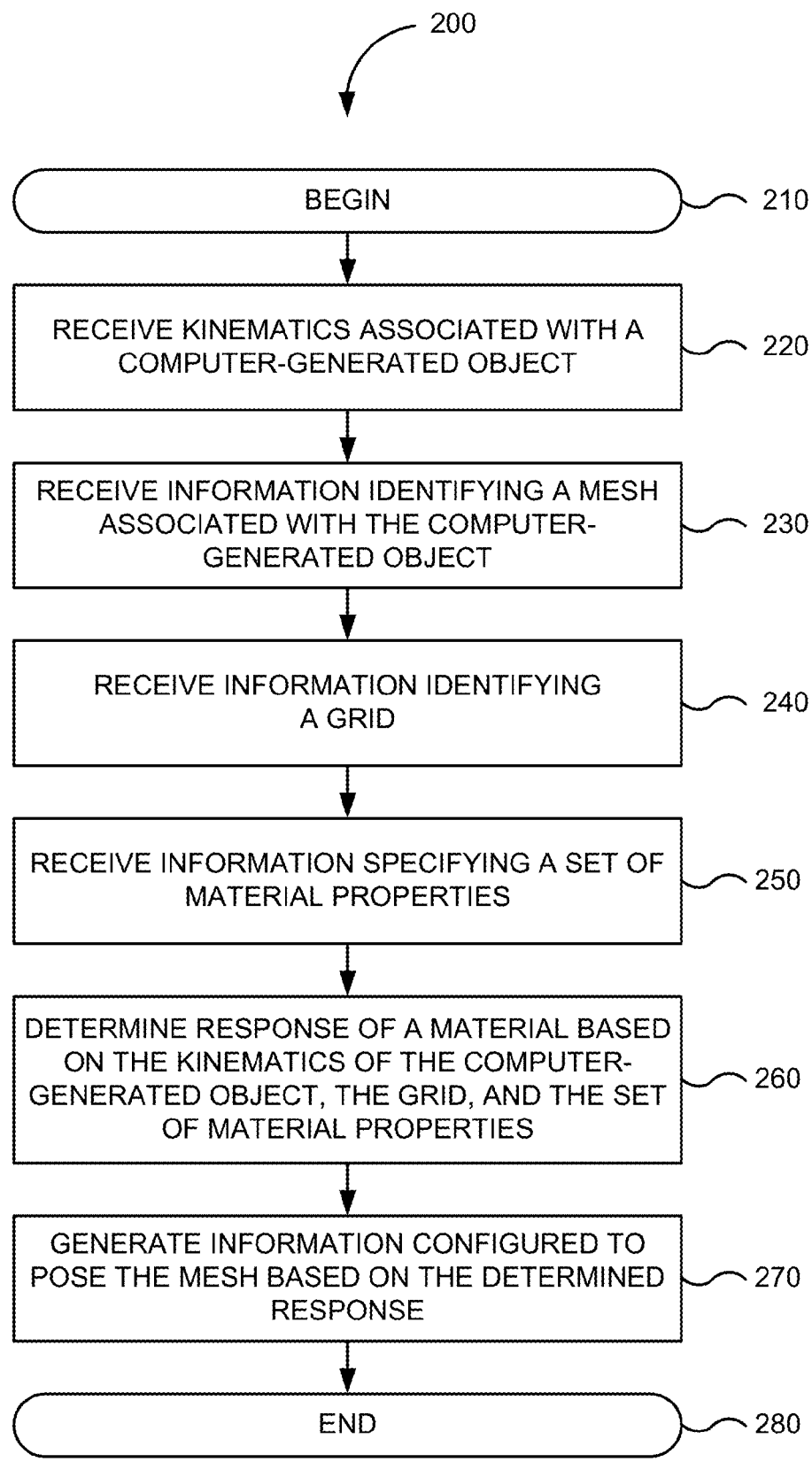
FIG. 2 is a flowchart of a method for simulating deformation in one embodiment.

FIG. 2 is a flowchart of method 200 for character skinning in one embodiment. While the method 200 of FIG. 2 is specifically addressed to skinning, its techniques can be broadly applied to any object experiencing forces and deformations. Implementations of or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 begins in step 210.

Figure 3A:
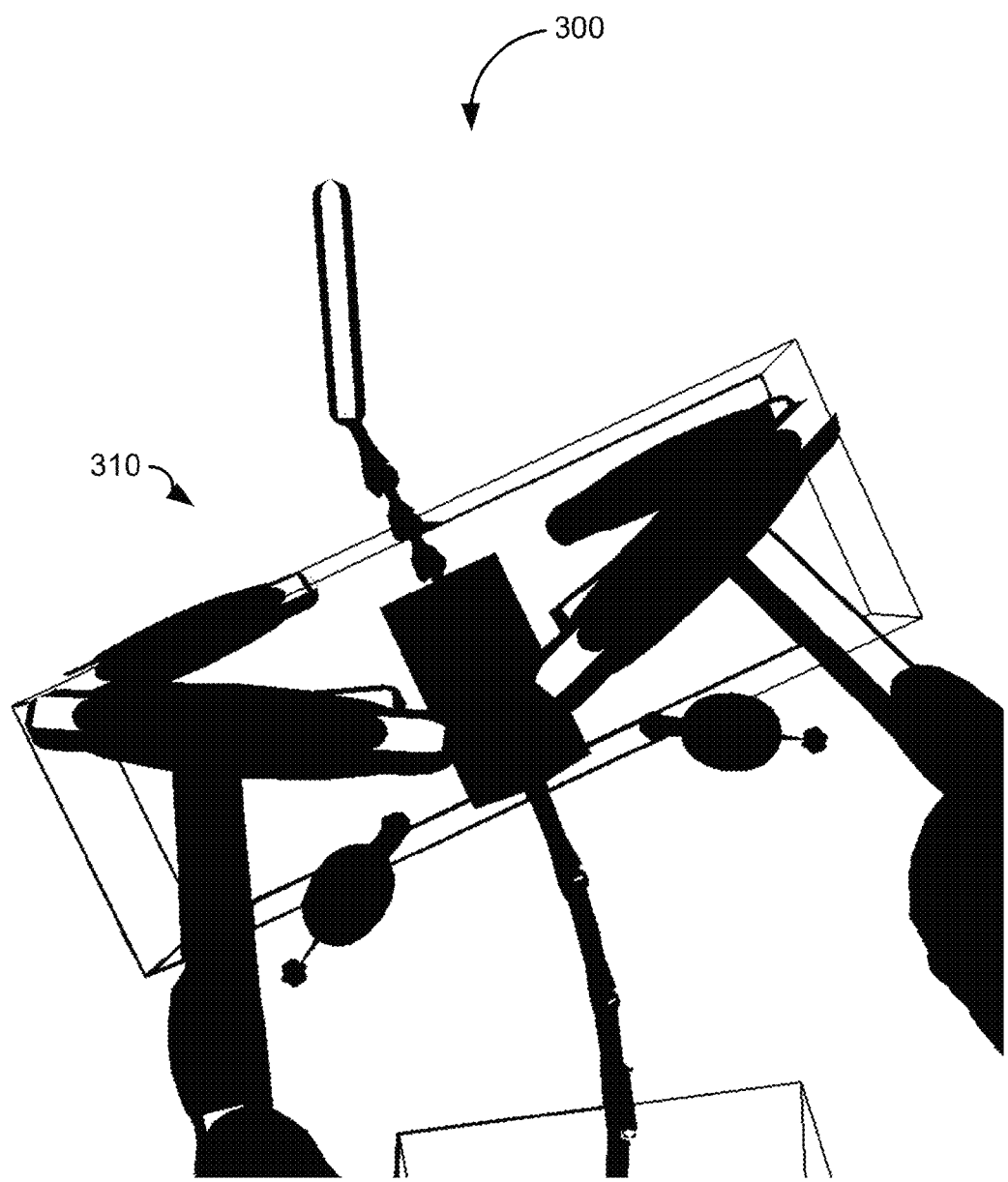
FIG. 3A is an illustration depicting rigging associated with a computer-generated character in one embodiment.

In step 220, kinematics associated with a computer-generated object are received. Some example of the kinematics that are received include motion and position of an object as well as other time-based information. For example, FIG. 3A is an illustration depicting rigging 310 associated with computer-generated character 300 in one embodiment. A user may manipulate one or more elements of rigging 310 to specify the position at keyframes of hands, arms, legs, and other body parts associated with character 300.

In step 230, information identifying a mesh associated with the computer-generated object is received. The mesh may include any number of points, lines, or surfaces. The mesh may further include one or more types of parametric surfaces typically used in CGI modeling, such as NURBS surfaces and subdivision surfaces. In some aspects, the mesh may include a set of control points (also known as control vertices or animation variables) that define the shape of the mesh. As discussed further below, a deformation algorithm ("deformer") is provided to simulate elasticity for character skinning to manipulate control points associated with the mesh.

Figure 3B:
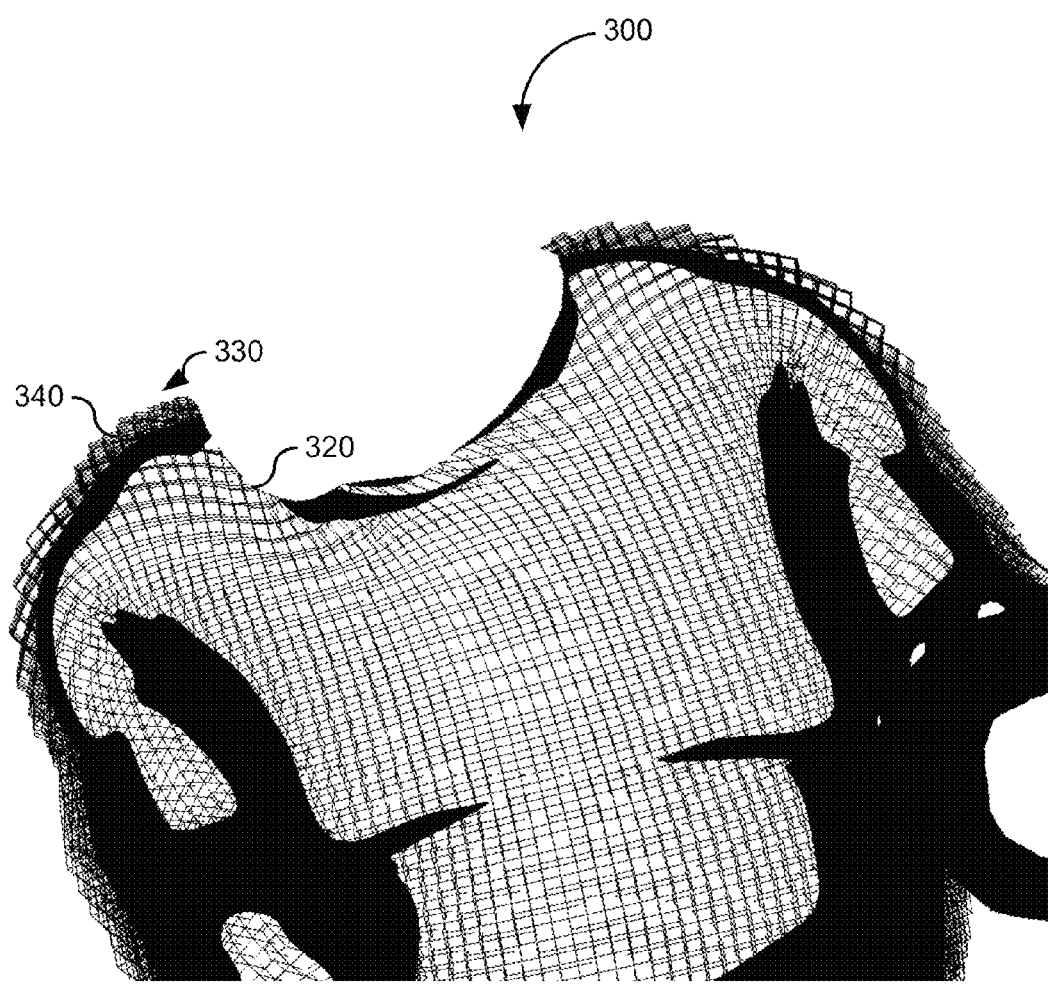
FIG. 3B is an illustration depicting a lattice embedding a mesh representing skin of the computer-generated character of FIG. 3A in one embodiment.

In step 240, information identifying a grid is received, which grid can be uniform or non-uniform. In some embodiments, a non-uniform grid can include, for example, a space partitioning tree such as an octree. In some embodiments, the octree can be "2:1 balanced", where the ratio of the edge lengths of adjacent elements does not exceed 2:1. Limiting the rate of graduation can improve the mesh quality and the convergence of the Finite Element Method. It also implies that each edge or face may have at most one hanging node, which limits the number of cases that must be considered. The grid can include any number of n-dimensional divisions. For example, the grid may include a polygonal mesh that is partitioned into any number of divisions, such as x, y, and z, and may be referred to as a "lattice." In some embodiments, the grid can include a staggered grid. In various embodiments, the grid or lattice surrounds the mesh associated with the computer-generated character. For example, FIG. 3B is an illustration depicting hexahedral lattice 330 embedding mesh 320 representing skin of character 300 of FIG. 3A in one embodiment. As the user moves elements of rigging 310, a deformer determines how the cells of the lattice are deformed eventually placing all or part of mesh 320 in new locations. A relatively low-resolution lattice can be used to create broad deformation on a high-resolution model. Moreover, although an unstructured lattice may provide more flexibility, the regular grid can provide for economy of storage. In particular, a linear octree encoding may be used. Additionally, some transformations and/or operators can be uniform across regular grids, eliminating the need for explicit storage.

In step 250, information is received specifying a set of material properties. The set of material properties define behavior of a continuum representation of a material (e.g., an elastic or plastic material). Some examples of material properties include shape, softness, stiffness, tendency to corrugate, tendency to preserve volume, tendency to compress, as well as other intensive properties and/or extensive properties. Other examples can include parameters that approximate course grain features underlying soft tissues, such as muscles, tendons, veins, and the like. In some embodiments, the set of material properties may be spatially varying. In one example, a user paints material parameters onto a surface mesh which are then extrapolated to the grid. In another example, the set of material properties are associated directly with the grid.

Figure 3C:
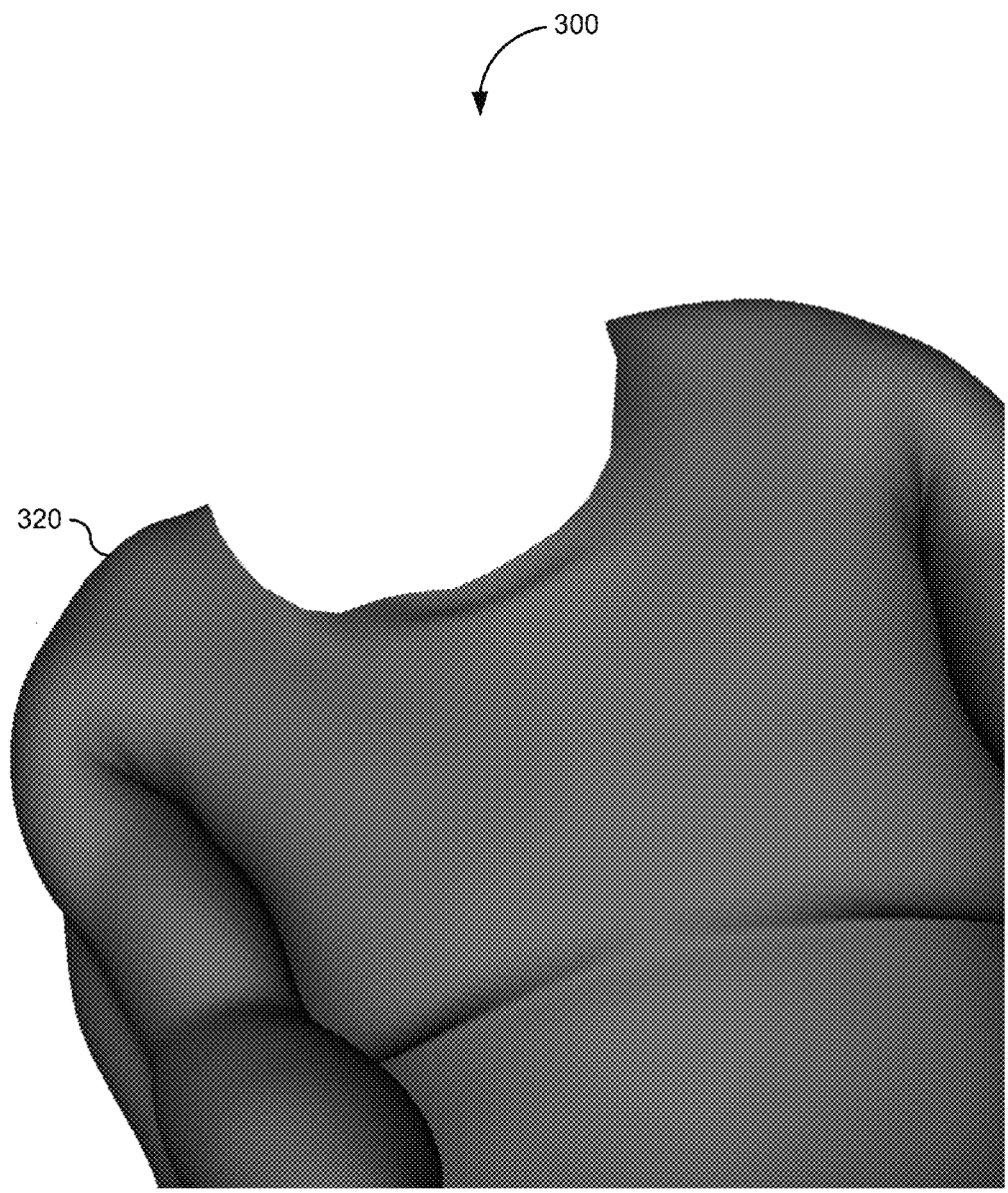
FIG. 3C is an illustration depicting a pose for the mesh representing skin of the computer-generated character of FIG. 3A that may be produced in one embodiment.

In step 260, skin response is determined based on the kinematics of the computer-generated object, the grid, and the set of material properties. For example, system 100 may solve the underlying constitutive equations for a continuum representation of a material to resolve internal and external forces. In step 270, information configured to pose the mesh is generated based on the determined response. In particular, how the cells of the lattice are deformed provide a basis for placing all or part of mesh 320 in new locations. FIG. 3C is an illustration depicting a pose for mesh 320 representing skin of character 300 of FIG. 3A that may be produced in one embodiment. FIG. 2 ends in step 280.

Consider an example of a deformation of a 3D elastic body that is a function $\phi:\Omega \rightarrow R^3$, which maps a material point X to a deformed world-space point x so $x=\phi(X)$. Subsequently, x and $\phi$ may be used interchangeably (i.e., $x(X) \equiv \phi(X)$). For hyperelastic materials in general, the response can be computed based on the deformation energy:

$$E = \int_\Omega \Psi(X, F(X)) dX \quad (1)$$

Energy density $\Psi$ can be considered as a function of the deformation gradient $F_{ij} = \partial \phi_i / \partial X_j$. Specifically for corotational elasticity, energy density is defined as:

$$\Psi = \mu \|F - R\|_F^2 + \frac{\lambda}{2} tr^2(R^T F - I) \quad (2)$$

where $\mu$ and $\lambda$ are the Lamé coefficients, and R is the rotation from the polar decomposition $F = RS$.

In one aspect, the model domain $\Omega$ is discretized into regular (e.g., cubic) elements $\Omega_e$ of step size $h_e$ so $\Omega = \cup_e \Omega_e$. The degrees of freedom are world space samples of $x_i = \phi(X_i)$. The discrete version of equation (1) then becomes a sum of energies from each element $E_e$.

In one aspect, a single quadrature point may be used to give $E_e$. For example, using just a single quadrature point for the voxel center $p^c$ gives $E_e \approx h_e^3 \Psi(F^e)$ where $F^e \approx F(p^c)$ is computed with central differences about the cell center from averaged faces.

This approximation can be written as:

$$F_{ij}^e = \sum_k G_{jk}^e x_k^{(i)} \quad (3)$$

where $x_k^{(i)}$ is the i-th component of the three-dimensional vector $x_k$ and a discrete gradient is provided by:

$$G^e = \frac{1}{4h_e} \begin{pmatrix} -1 & 1 & -1 & 1 & -1 & 1 & -1 & 1 \\ -1 & -1 & 1 & 1 & -1 & -1 & 1 & 1 \\ -1 & -1 & -1 & -1 & 1 & 1 & 1 & 1 \end{pmatrix}$$

Accordingly, a means is provided to compute the total energy in terms only of the nodal world positions of the regular elements (e.g., a hexahedral lattice) into which the model domain was discretized.

A discrete force per node can in general be provided as:

$$f_i = -\frac{\partial E}{\partial x_i} = \sum_e \left(-\frac{\partial E_e}{\partial x_i}\right) = \sum_e f_i^e \quad (4)$$

Using equation (3) and the fact that $\Psi$ is a function of the deformation gradient alone, a concise expression for each of the components of $f_e = (f_i^{(1)}, f_i^{(2)}, f_i^{(3)})$ (the force contribution to node i from element e) is:

$$f_i^{(j)} = -\frac{\partial E_e}{\partial x_i^{(j)}} = -V_e \frac{\partial \Psi(F^e)}{\partial x_i^{(j)}} = -V_e \sum_{k,l} \frac{\partial \Psi}{\partial f_{kl}}\bigg|_{F^e} \frac{\partial F_{kl}^e}{\partial x_i^{(j)}} \quad (5)$$

$$= -V_e \sum_{k,l} [P(F^e)]_{kl} G_{li}^e \delta_{jk} = -V_e \sum_l [P(F^e)]_{jl} G_{li}^e$$

$$= -V_e [P(F^e) G^e]_{ji}$$

where $P(F) := \partial \Psi / \partial F$ is the 1st Piola-Kirchhoff stress tensor. For corotational elasticity as defined in equation (2), the 1st Piola-Kirchhoff stress tensor is provided by:

$$P = R[2\mu(S-I) + \lambda tr(S-I)] \quad (6)$$

Combining equation (6) with equation (5), a matrix is provided that maps the nodal positions of an element to its force contribution:

$$f^e(f_1^e f_2^e \ldots f_8^e) = -V_e P(F^e) G^e \quad (7)$$

At each nodal position $X := (x_1, \ldots, x_8)$, forces $f(x) := (f_1(x_1), \ldots, f_N(x_N))$ are computed in addition to any external forces g. For quasistatics, the resulting force balance equation $f + g = 0$ is solved using Newton-Raphson where the k-th iterate requires the solution of the following linearized system:

$$K(x^{(k)}) \delta x^{(k)} = g + f(x^{(k)}) \quad (8)$$

Here, $$K(x^{(k)}) := -\frac{\partial f}{\partial x}\bigg|_{x^{(k)}}$$

-continued $$\delta x^{(k)} := x^{(k+1)} - x^{(k)}.$$

Equation (8) is formulated to require solving K at every iteration of a Newton-Raphson solver. However, forming such a matrix explicitly would incur significant performance losses from the 243 non-zero entries needed per node. Instead, in various embodiments, a procedure is defined that directly determines the product $K\delta x = \delta f$ (where $\delta x$ is a displacement), allowing the use of a Krylov solver.

The product $K\delta x = \delta f$ is the force differential induced by the displacements. Applying differentials on equations (4) and (7), the differential of each nodal force can be provided as $\delta f_i = \Sigma_e \delta f_i^e$ where:

$$(\delta f_1^e \delta f_2^e \ldots \delta f_8^e) = -h_e^3 \delta[P(F^e)] G^e \quad (9)$$

Taking differentials of $R^T R = I$, $(R^T \delta R)^T + R^T \delta R = 0$ is obtained, thus the matrix $\delta R^T R$ is skew symmetric. Consequently, $tr(\delta R^T F) = tr(\delta R^T RS) = (\delta R^T R):S = 0$ as a contraction of a symmetric and a skew symmetric matrix. Using this result, differentials are taken on equation (6) to obtain:

$$\delta P = 2\mu(\delta F - \delta R) + \lambda\{tr(\delta R^T F) + tr(R^T \delta F)\}R + \quad (10)$$
$$\lambda tr(R^T F - I)\delta R$$
$$= 2\mu\delta F + \lambda tr(R^T \delta F)R + \{\lambda tr(S - I) - 2\mu\}\delta R$$

The differential $\delta F$ of the (discrete, cell-centered) deformation gradient is computed from equation (3) according to the formula:

$$\delta F_{ij}^e = \sum_k G_{jk}^e \delta x_k^{(i)} \quad (11)$$

The differential of rotation R is given by:

$$\delta R = R[\epsilon((tr(S)I - S)^{-1}(\epsilon:(R^T \delta F)))] \quad (12)$$

where $\epsilon$ is the alternating third order tensor which maps a vector to a cross product matrix. Equation (12) is a compact expression of the result presented in [Twigg and Kačić-Alešić 2010].

In summary, for every element or cell $\Omega_e$ in the model domain, system 100 determines a cell-centered deformation gradient $F^e$ using equation (3) and computes its polar decomposition. Using equations (10), (11) and (12), system 100 determines $\delta P$ corresponding to the displacements $\delta x$ using equations (10), (11), and (12). Finally, system 100 determines the contribution of $\Omega_e$ to the force differential using equation (9) and accumulates the determined values onto $\delta f$.

One Point Quadrature Stabilization Method

As discussed above, system 100 provides a discretization of a continuum representation of a material using a single quadrature point per cell. In some aspects, this choice promises better performance since it requires only one singular value decomposition (SVD)/polar decomposition per cell (rather than the 8 required with Gauss quadrature). Unfortunately, this alone can lead to catastrophic defects. In various embodiments, system 100 stabilizes the one point quadrature approach to drastically improve performance by still requiring just one SVD/polar decomposition per cell while also capturing other deformation modes.

Figure 4:
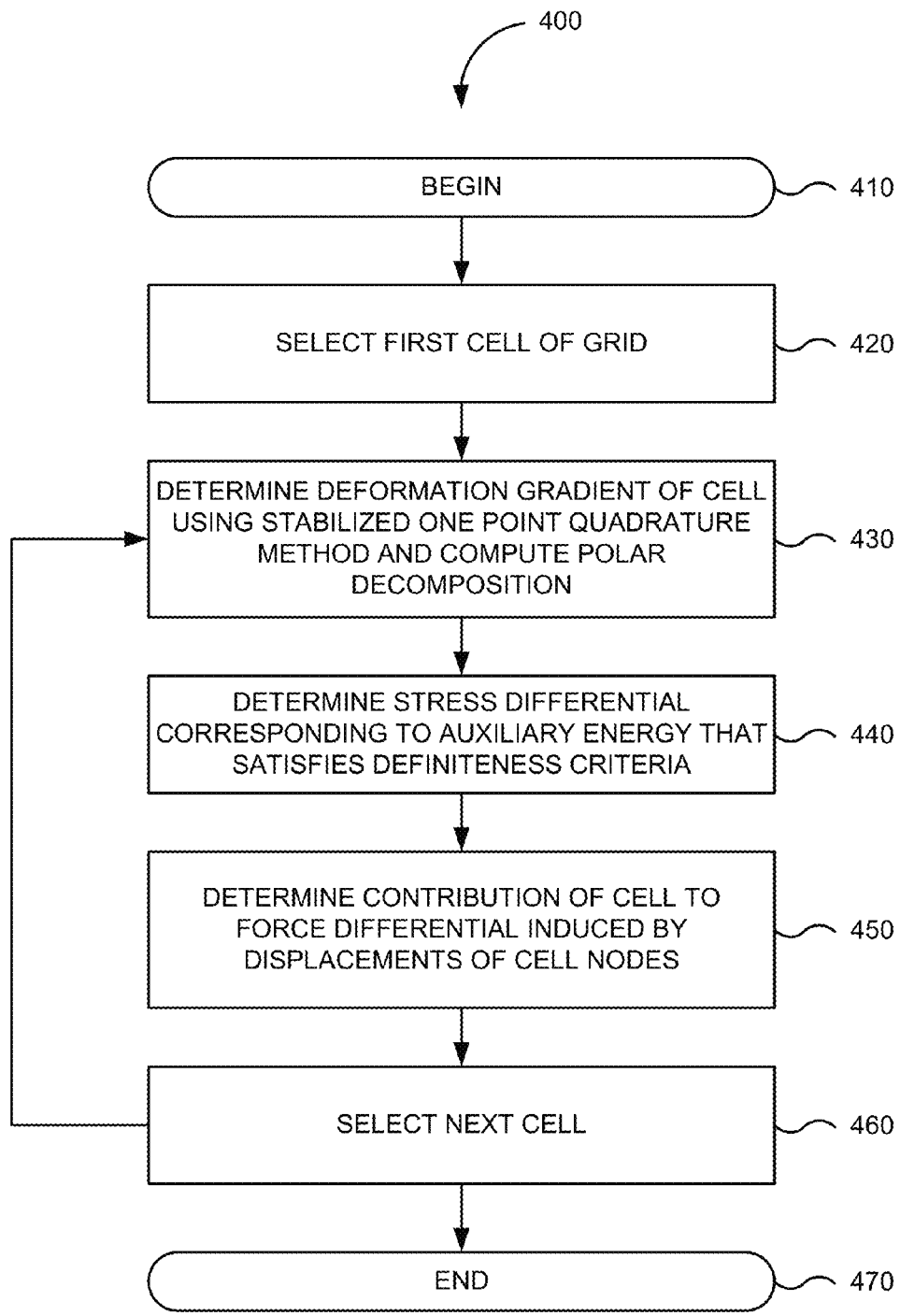
FIG. 4 is a flowchart of a method for determining response of a continuum representation of a material for posing a mesh representing skin of the computer-generated character of FIG. 3A in one embodiment.

FIG. 4 is a flowchart of method 400 for determining response of a continuum representation of material for posing mesh 300 representing skin of character 300 of FIG. 3A in one embodiment. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, a first cell of a grid is selected. In step 430, the deformation gradient of the cell is determined using a stabilized one point quadrature method. For example, consider again a cell that has 8 nodal points (24 DOFs). A one-point quadrature based elemental energy that is only dependent on the cell centered deformation gradient (9 DOFs) leads to a large subspace of deformation modes that have no effect on the discrete energy. This "nullspace" might only appear element-by-element and in the union of all elements, these modes would be penalized.

Figure 5:
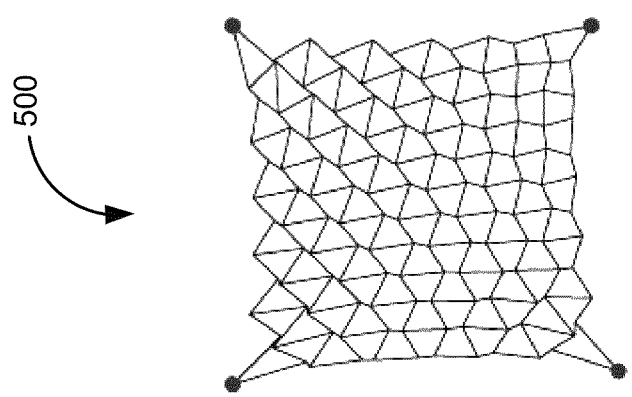
FIG. 5 is an illustration depicting how a red-black ordering of grid nodes using a one point quadrature that is only dependent on the cell centered deformation gradient results in visual artifacts.

Unfortunately, in most cases, there exist nonphysical global modes that have no effect on discrete energy. For example, consider a red-black ordering of grid nodes, and assign one constant displacement to red nodes and another to all black ones. Using a one-point quadrature that is only dependent on the cell centered deformation gradient, such constant displacement will not be seen by the discrete energy but will become visible as parasitic "hourglassing" artifacts in force equilibrium. FIG. 5 is an illustration depicting how the red-black ordering of grid nodes using the one point quadrature that is only dependent on the cell centered deformation gradient results in visual artifacts. Accordingly, these oscillatory nullspace modes are more than visual artifacts, they compromise the ellipticity of the discrete equations in multigrid methods. This is why standard discretizations use higher-order quadrature, gaining stability at higher cost.

Figure 6:
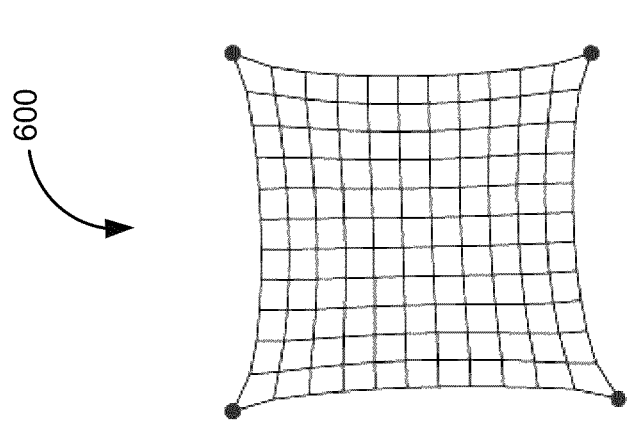
FIG. 6 is an illustration depicting that the red-black ordering of grid nodes using a one point quadrature method that considers other modes does not result in visual artifacts in one embodiment.

To remedy these instabilities, in various embodiments, system 100 incorporates an integration rule that is stable yet computationally cheap (e.g., still requires only one polar decomposition per cell). FIG. 6 is an illustration depicting that the red-black ordering of grid nodes using a stabilized one point quadrature method does not result in visual artifacts in one embodiment. Specifically, the term $\mu\|F-R\|_F^2$ in equation (2) primarily determines stability. If a stable technique (e.g., an 8-point Gauss quadrature) is used to integrate this term, the entire scheme will remain stable, even if a one-point quadrature that is only dependent on the cell centered deformation gradient is used for the term $$\frac{\lambda}{2} tr^2(R^T F - I).$$

Figure 7:
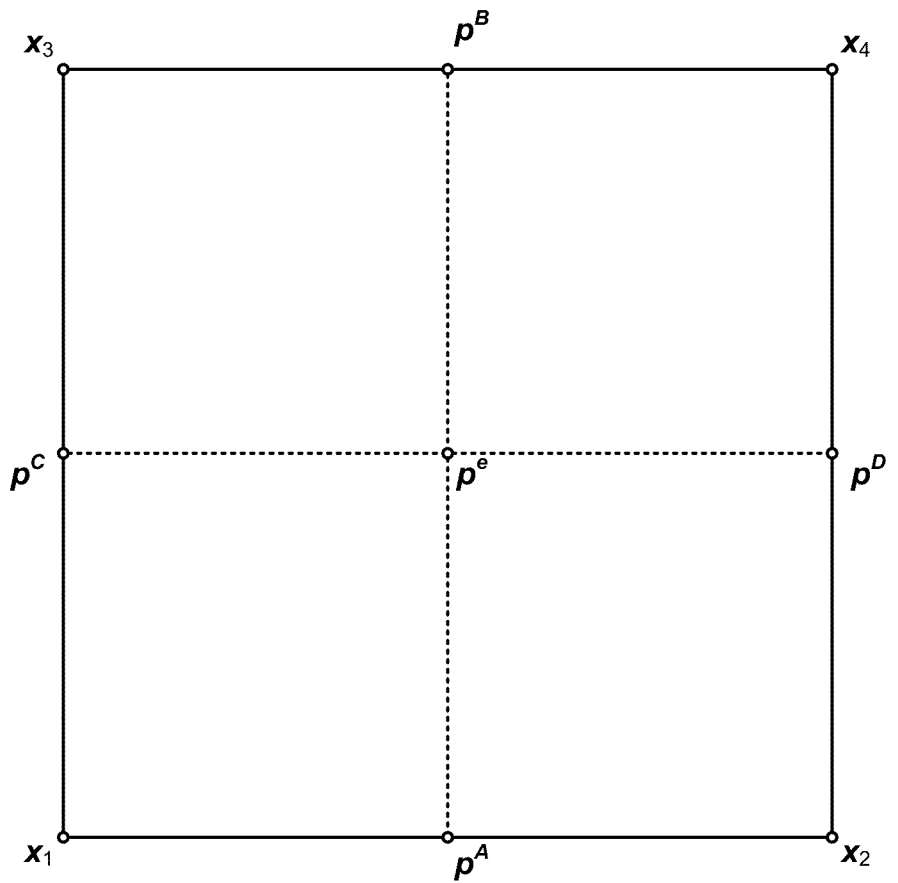
FIG. 7 is an illustration depicting exemplary quadrature points of a lattice cell in 2D in one embodiment.
Figure 7:
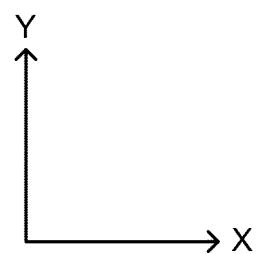

Consider a 2D case (e.g. a uniform grid having a quadrilateral lattice), using a simpler energy density $\Psi = \mu\|F-R\|_F^2$. The use of staggered grids to avoid instability from non-physical modes when using central differencing can be seen in many Eulerian fluid dynamics methods. [Harlow and Welch 1965] introduced the staggered MAC grid for velocities and pressure, and [Gerritsma 1996; Goktekin et al. 2004] extended this to viscoelastic fluids by staggering the second order stress or strain tensors. Similarly, in this example, in addition to a cell center $p^e$, four additional quadrature points $p^q$, $q \in \{A,B,C,D\}$ are introduced located on edge centers of the quadrilateral lattice. FIG. 7 is an illustration depicting additionally quadrature points of a lattice cell in 2D in one embodiment. The energy is provided by:

$$\Psi = \mu \sum_{i,j} (F_{ij} - R_{ij})^2 \quad (13)$$

In several aspects, a different quadrature rule is followed for every term $(F_{ij}-R_{ij})^2$ in equation (13). In particular, instead of using a single quadrature point $p^e$ at the cell center, system 100 uses those locations within the cell (possibly more than one) where $F_{ij}$ is "naturally" defined, as a central difference of a plurality of degrees of freedom (e.g., a central difference of just two degrees of freedom). In this way, system 100 avoids averaging and risk of cancellation associated with expressing all derivatives exclusively at the cell center.

In FIG. 7, it can be observed that the x-derivatives $F_{11}$ and $F_{21}$ are naturally defined at the centers $p^A$ and $p^B$ of x-oriented edges, while the y-derivatives $F_{12}$ and $F_{22}$ are naturally located at points $p^C$ and $p^D$ of y-oriented edges.

Accordingly, system 100 evaluates the cell-centered deformation gradient $F^e$ following exactly equation (3), determines matrix $R^e$ from the polar decomposition of $F^e$, and uses the information from this matrix wherever $R_{ij}$ is needed in equation (13). Thus, system 100 may implement a quadrature method that takes the form:

$$E_e = \frac{\mu h_e^2}{2} \sum_{i=1}^{2} \left[ \sum_{q \in \{A,B\}} (F_{i1}^q - R_{i1}^e)^2 + \sum_{q \in \{C,D\}} (F_{i2}^q - R_{i2}^e)^2 \right] \quad (14)$$

Figure 8:
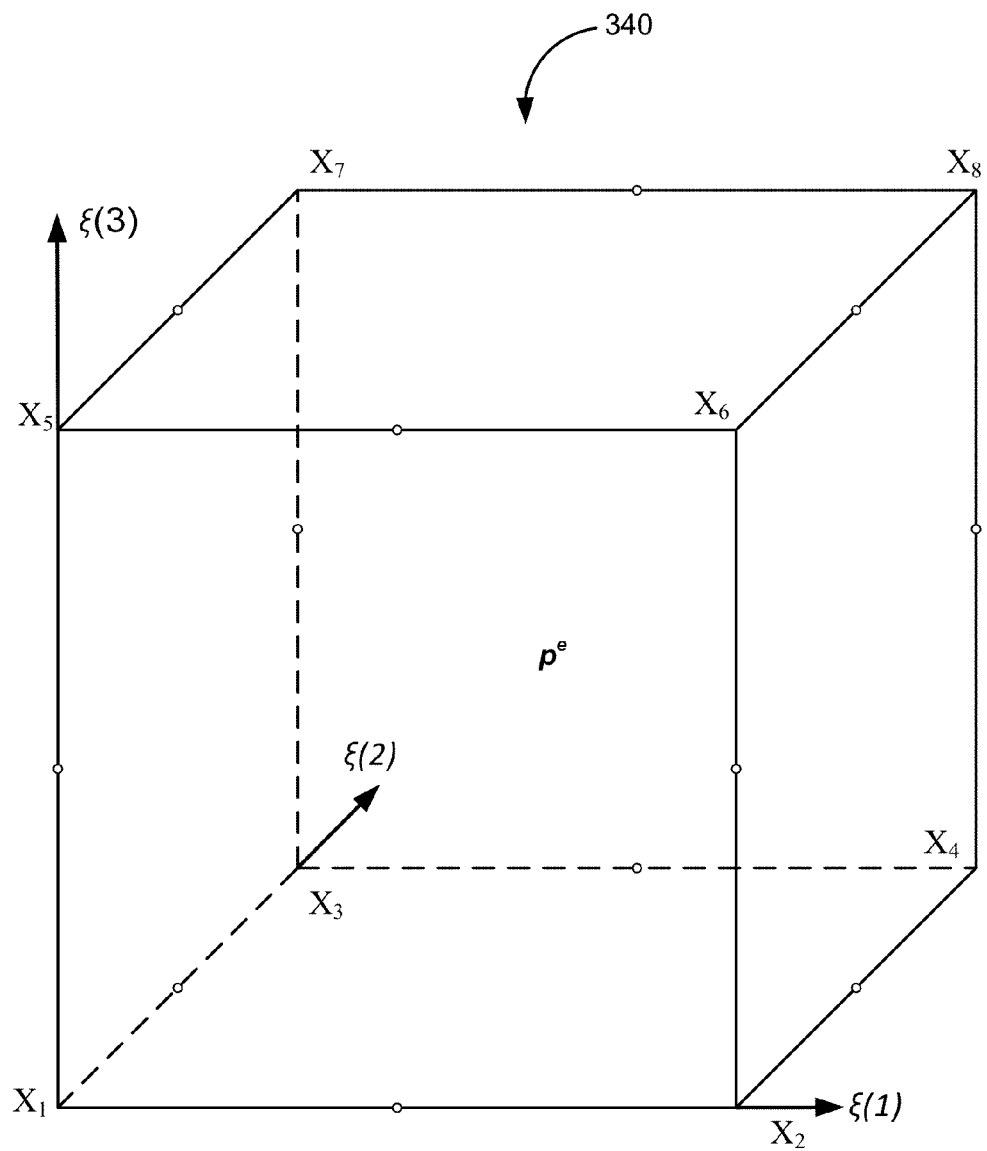
FIG. 8 is an illustration depicting exemplary quadrature points of a lattice cell in 3D in one embodiment.

This can be easily extended to higher dimensions. FIG. 8 is an illustration depicting nodes $X_1$, $X_2$, $X_3$, $X_4$, $X_5$, $X_6$, $X_7$, and $X_8$, axes $\xi(1)$, $\xi(2)$, and $\xi(3)$. Each of the nodes is associated with one of the following shape functions sharing its number:

$N_1(\xi) = (1-\xi^{(1)})(1-\xi^{(2)})(1-\xi^{(3)})$ $N_2(\xi) = \xi^{(1)}(1-\xi^{(2)})(1-\xi^{(3)})$ $N_3(\xi) = (1-\xi^{(1)})\xi^{(2)}(1-\xi^{(3)})$ $N_4(\xi) = \xi^{(1)}\xi^{(2)}(1-\xi^{(3)})$ $N_5(\xi) = (1-\xi^{(1)})(1-\xi^{(2)})\xi^{(3)}$ $N_6(\xi) = \xi^{(1)}(1-\xi^{(2)})\xi^{(3)}$ $N_7(\xi) = (1-\xi^{(1)})\xi^{(2)}\xi^{(3)}$ $N_8(\xi) = \xi^{(1)}\xi^{(2)}\xi^{(3)}$.

FIG. 8 further illustrates locations within a lattice cell in 3D where $F_{ij}$ is "naturally" defined, as a central difference of a plurality of degrees of freedom in one embodiment.

Considering that $$F_{i1}^e = \frac{1}{2} \sum_{q \in \{A,B\}} F_{i1}^q$$

and $$F_{i2}^e = \frac{1}{2} \sum_{q \in \{C,D\}} F_{i2}^q$$

since the entries of $F^e$ were defined as averaged central differences. Using these identities, equation (14) can be transformed into $E_e = E_1 + E_2$, with:

$$E_1 = \frac{\mu h_e^2}{2} \sum_{i=1}^{2} \left( (F_{i1}^A)^2 + (F_{i1}^B)^2 + (F_{i2}^C)^2 + (F_{i2}^D)^2 \right), \quad (15)$$

and $$E_2 = \mu h_e^2 [-2tr(R^{eT} F^e) + \|I\|_F^2] \quad (16)$$

The energy discretization suggested by equations (15) and (16) is considered stable.

In order to better explain the mechanics of this approach, the μ-component of the energy can be manipulated as follows:

$$\Psi = \mu \|F-R\|_F^2 = \mu \|F\|_F^2 - 2\mu tr(R^T F) + \mu \|I\|_F^2$$

Equation (15) suggests a quadrature rule for the term $\mu \|F\|_F^2$. The integral $\frac{1}{2} \int \|F\|_F^2$ is the weak form of the component-wise Laplace operator; thus equation (15) generates an energy discretization for the Laplace operator $2\mu\Delta$. Equation (16) may be viewed as a one-point quadrature, but on the term $-2\mu tr(R^T F) + \mu \|I\|_F^2$. At this point we can re-introduce the omitted λ-component of the energy, and write $\Psi$ as:

$$\Psi = \underbrace{\mu \|F\|_F^2}_{\Psi_\Delta} \underbrace{- 2\mu tr(R^T F) + \mu \|I\|_F^2 + \frac{\lambda}{2} tr^2(R^T F - I)}_{\Psi_{aux}} \quad (17)$$

Accordingly, system 100 implements a discretization by separating energy, forces, and force differentials into two components: (a) a term stemming from the Laplace energy $\Psi_\Delta$ and (b) an auxiliary term originating from $\Psi_{aux}$, which is integrated with the stable one-point quadrature method. Note that the forces arising from the Laplace term are purely linear, and the stiffness matrix resulting from the same term is constant (and equal to a Laplace matrix), leading to a minimal implementation overhead, over the standard cost of one-point quadrature for the auxiliary term.

Constraints and Collisions

In further embodiments, system 100 provides the ability to handle elaborate collisions.

In one aspect, point constraints are provided to enforce both soft constraints, such as bone attachments, and to handle object and self collisions. Specifically, proxy points ($x_p$) are embedded in simulation lattices and their associated forces are distributed (e.g., trilinearly) to the vertices of the regular grid cells (e.g., hexahedron) that contain them. [Sifakis et al. 2007] show the effectiveness of this basic approach.

Hanging Nodes

Figure 9:
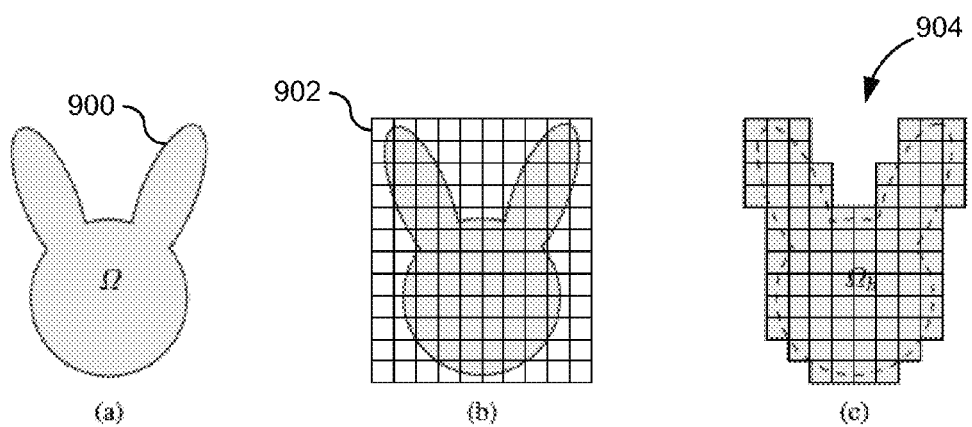
FIG. 9 is an illustration depicting the embedding of a domain with a uniform grid.

In some embodiments, the use of a non-uniform grid, and specifically the use of a grid created with a space partitioning tree such as an octree, can result in the creation of hanging nodes. As seen in FIG. 9, a domain 900 is embedded within a uniform grid 902. The embedding of the domain 900 in the uniform grid 902 allows the creation of the discretized domain 904 that is formed of a plurality of rectangular cells. As the rectangular cells of the discretized domain 904 are the same size, the corners of the cells are adjacent to corners of other cells.

Figure 10:
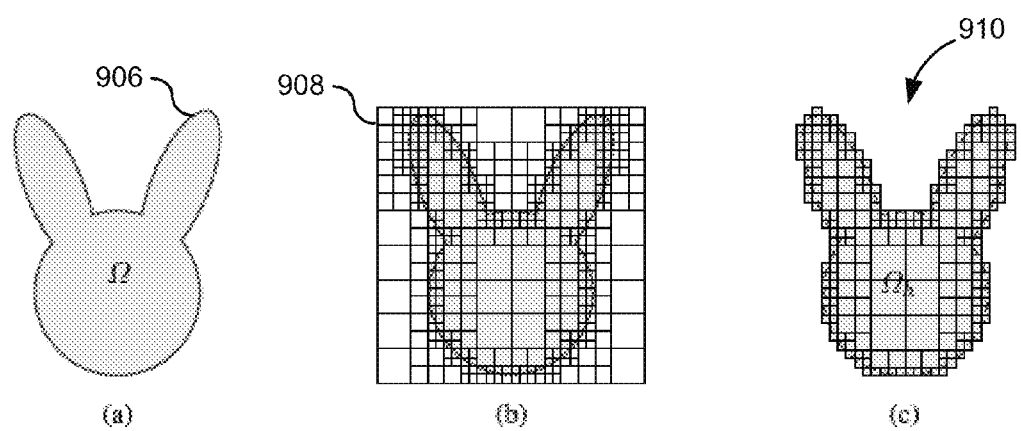
FIG. 10 is an illustration depicting the embedding of a domain with a non-uniform grid.

As seen in FIG. 10 a domain 906 is embedded within a non-uniform grid 908, and specifically is embedded in a quadtree. The embedding of the domain 906 in the non-uniform grid 908 allows the creation of the discretized domain 910 that is formed of a plurality of rectangular cells. In some embodiments, these cells can be controlled such that cells at any desired location within the domain 906 have a desired size and/or shape. This control of the cells can allow the providing of a desired level of resolution at one or several locations within the domain 906. In some embodiments, for example, the cells can be controlled to be smaller when a higher level of resolution is desired such as, for example, along a boundary of the domain 906.

As the rectangular cells of the discretized domain 910 have different sizes, the corners of the cells are not always adjacent to corners of other cells, but in some instances the corners of cells are adjacent to intermediate portions of cells.

Figure 11:
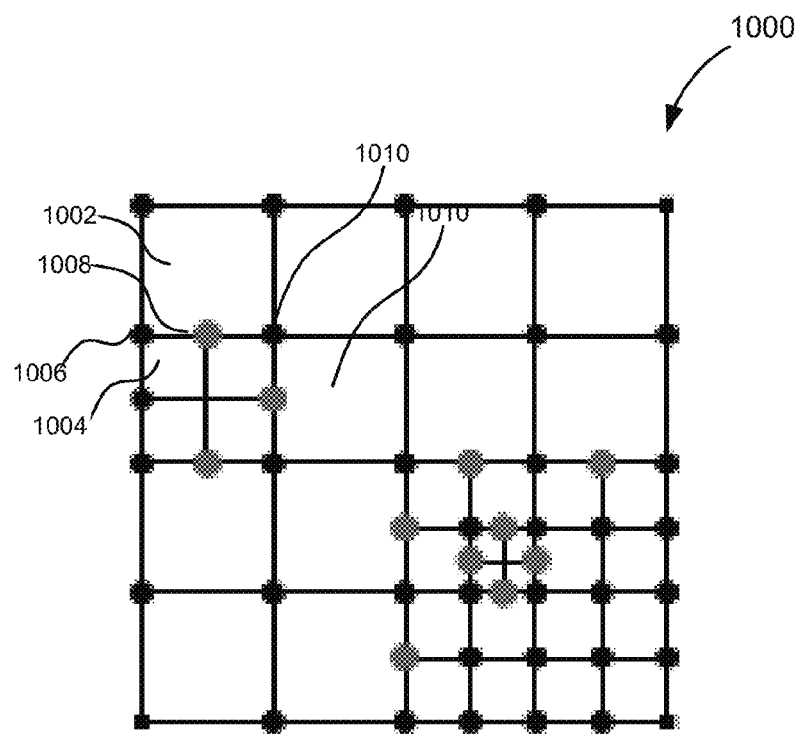
FIG. 11 is an illustration depicting the creation of "hanging nodes" via non-uniform element sizes.

FIG. 11 depicts a non-uniform grid 1000 that includes a first cell 1002 having a first size and a second cell 1004 having a second size. The first cell 1002 and the second cell 1004 are adjacent such that portions of the boundary of the first cell 1002 coincide with portions of the boundary of the second cell 1004. Specifically, the boundary of the first cell 1002 defined by corners, also referred to herein as nodes, 1006 and 1010 coincides with the boundary of the second cell 1004 defined by corners 1006 and 1008.

As further seen in FIG. 11, the first cell 1002 is four times as large as the second cell 1004. As a result of the size differential between the first cell 1002 and the second cell 1004, the node 1008 is located intermediate between nodes 1006 and 1010. Such an intermediate node, which is a node that is in the middle of an edge or face arising from the positioning of a smaller cell or element adjacent to a larger cell or element is identified herein as a "hanging node."

Figure 12:
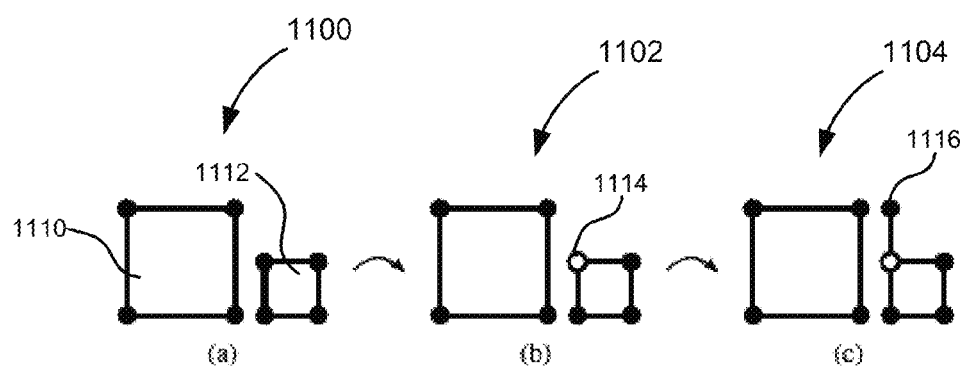
FIG. 12 is an illustration of one embodiment of a method of resolving hanging nodes.

In some embodiments, the existence of hanging nodes can complicate analysis of the discretized domain 910, as the larger of the cells lacks a degree of freedom at the location of the hanging node. In some embodiments, hanging nodes can be resolved as indicated in FIG. 12. In Step 1100 of FIG. 12 a first element 1110 having a first size is identified as adjacent to a second element 1112 of a second, different size. In step 1102 of FIG. 12, the one or several hanging nodes 1114 generated by the adjacency of the first and second elements 1110, 1112 are identified. The one or several hanging nodes 1114 are removed as degrees of freedom in the smaller of the elements. Specifically as depicted in FIG. 12, the hanging node 1114 is removed as a degree of freedom from the second element 1112. Then, and as indicated in step 1104 of FIG. 12, the hanging node 1114 is replaced with the unoccupied node 1116 from the adjacent, larger element. Specifically, as depicted in FIG. 12, the hanging node 1114 is replaced by the unoccupied node 1116 of the first element 1110.

In some embodiments, steps 1100 to 1104 can include: identifying the smaller of the elements 1110, 1112; identifying any hanging nodes in the smaller of the elements 1110, 1112; identifying the shape functions associated with the nodes of the elements 1110, 1112; determining the derivative of at least some of the shape functions associated with the nodes of the elements 1110, 1112; generating a matrix containing the derivative of at least some of the shape functions associated with the nodes of the elements 1110, 1112; modifying the shape function(s) defining the location of the hanging node(s); and generating a modified matrix containing the derivative of at least some of the shape functions associated with the nodes of the elements 1110, 1112 to include the derivative of the shape function(s) defining the location of the hanging node(s).

In some embodiments, modifying the shape function(s) associated with the hanging node(s) can include: selecting a hanging node and identifying at least one non-hanging node of the larger of the elements 1110, 1112 adjacent to the hanging node. In some embodiments, the closest of these at least one non-hanging nodes can be selected, and a shadow node can be generated at the location of the selected closed of the at least one non-hanging nodes. Modifying the shape function(s) associated with the hanging node(s) can include: determining shape functions of the at least one non-hanging node adjacent to the hanging node; and interpolating the value of the hanging node from the shape functions of the at least one non-hanging node adjacent to the hanging node.

In some embodiments, in which the value of one or several non-hanging nodes, also referred to herein as "conforming nodes," of one element is known, a "gather function" can be used to determine the values of one or several hanging nodes of an adjacent element. Conversely, if the value of one or several hanging nodes of one element is known, a "scatter" function can be used to determine the values of one or several conforming nodes of an adjacent element. The algorithms for gather and scatter functions are shown below:

---

Algorithm 1 Gather and interpolate the octree-global values u from octant's conforming nodes to the octant-local values w at octant's primary nodes.

---

```
 1: procedure GATHER(octant, u)
 2:     offset ← OCTANTCHILDOFFSET(octant)
 3:     c_w ← CHILDNUMBER(offset)        ▷ The node shared with the
                                           octant's parent
 4:     c_u ← GLOBALNODEID(octant, c_w)
 5:     w[c_w] ← u[c_u]                  ▷ Can not be a
                                           hanging node
 6:     j_w ← OPPOSITENODE(c_w)          ▷ The node shared with the
                                           octant's siblings
 7:     j_u ← GLOBALNODEID(octant, j_w)
 8:     w[j_w] ← u[j_u]                  ▷ Can not be a
                                           hanging node
 9:     for k ← 1, 3 do                  ▷ Check for edge-
                                           hanging nodes
10:         j_w ← EDGEHANGINGNODE(c_w, k)
11:         j_u ← GLOBALNODEID(octant, j_w)
12:         if NODEHANGING(octant, j_w) then
13:             w[j_w] ← 0.5(u[c_u] + u[j_u])
14:         else
15:             w[j_w] ← u[j_u]
16:         end if
17:     end for
18:     for k ← 1, 3 do                  ▷ Check for face-
                                           hanging nodes
19:         j_w ← FACEHANGINGNODE(c_w, k)
20:         j_u ← GLOBALNODEID(octant, j_w)
21:         if NODEHANGING(octant, j_w) then
22:             j_aw ← FACEHANGINGNODEA(c_w, k)
23:             j_bw ← FACEHANGINGNODEB(c_w, k)
24:             j_au ← GLOBALNODEID(octant, j_aw)
25:             j_bu ← GLOBALNODEID(octant, j_bw)
26:             w[j_w] ← 0.25(u[c_u] + u[j_u] + u[j_au] + u[j_bu])
27:         else
28:             w[j_w] ← u[j_u]
29:         end if
30:     end for
31:     return w
32: end procedure
```

Algorithm 2 Gather and interpolate the octant-local values u from octant's conforming nodes to the octant-local values w at octant's primary nodes.

```
 1: procedure LOCALGATHER(octant, u)
 2:     offset ← OCTANTCHILDOFFSET(octant)
 3:     c ← CHILDNUMBER(offset)            ▷ The node shared with the
                                              octant's parent
 4:     w[c] ← u[c]                        ▷ Can not be a
                                              hanging node
 5:     j ← OPPOSITENODE(c)                ▷ The node shared with the
                                              octant's siblings
 6:     w[j] ← u[j]                        ▷ Can not be a
                                              hanging node
 7:     for k ← 1, 3 do                    ▷ Check for edge-
                                              hanging nodes
 8:         j ← EDGEHANGINGNODE(c, k)
 9:         if NODEHANGING(octant, j) then
10:             w[j] ← 0.5(u[c] + u[j])
11:         else
12:             w[j] ← u[j]
13:         end if
14:     end for
15:     for k ← 1, 3 do                    ▷ Check for face-
                                              hanging nodes
16:         j ← FACEHANGINGNODE(c, k)
17:         if NODEHANGING(octant, $j_w$) then
18:             $j_a$ ← FACEHANGINGNODEA(c, k)
19:             $j_b$ ← FACEHANGINGNODEB(c, k)
20:             w[j] ← 0.25(u[c] + u[j] + u[$j_a$] + u[$j_b$])
21:         else
22:             w[j] ← u[j]
23:         end if
24:     end for
25:     return w
26: end procedure
```

Algorithm 3 Scatter with weights the octant-local values w from octant's primary nodes to the octree-global values u at octant's conforming nodes.

```
 1: procedure SCATTER(octant, w, u)
 2:     offset ← OCTANTCHILDOFFSET(octant)
 3:     $c_w$ ← CHILDNUMBER(offset)        ▷ The node shared with the
                                              octant's parent
 4:     $c_u$ ← GLOBALNODEID(octant, $c_w$)
 5:     u[$c_u$] ← u[$c_u$] + w[$c_w$]     ▷ Can not be a
                                              hanging node
 6:     $j_w$ ← OPPOSITENODE($c_w$)        ▷ The node shared with the
                                              octant's siblings
 7:     $j_u$ ← GLOBALNODEID(octant, $j_w$)
 8:     u[$j_u$] ← u[$j_u$] + w[$j_w$]     ▷ Can not be a
                                              hanging node
 9:     for k ← 1, 3 do                    ▷ Check for edge-
                                              hanging nodes
10:         $j_w$ ← EDGEHANGINGNODE($c_w$, k)
11:         $j_u$ ← GLOBALNODEID(octant, $j_w$)
12:         if NODEHANGING(octant, $j_w$) then
13:             u[$j_u$] ← u[$j_u$] + 0.5w[$j_w$]
14:             u[$c_u$] ← u[$c_u$] + 0.5w[$j_w$]
15:         else
16:             u[$j_u$] ← u[$j_u$] + w[$j_w$]
17:         end if
18:     end for
19:     for k ← 1, 3 do                    ▷ Check for face-
                                              hanging nodes
20:         $j_w$ ← FACEHANGINGNODE($c_w$, k)
21:         $j_u$ ← GLOBALNODEID(octant, $j_w$)
22:         if NODEHANGING(octant, $j_w$) then
23:             $j_{aw}$ ← FACEHANGINGNODEA($c_w$, k)
24:             $j_{bw}$ ← FACEHANGINGNODEB($c_w$, k)
25:             $j_{au}$ ← GLOBALNODEID(octant, $j_{aw}$)
26:             $j_{bu}$ ← GLOBALNODEID(octant, $j_{bw}$)
27:             u[$j_u$] ← u[$j_u$] + 0.25w[$j_w$]
28:             u[$c_u$] ← u[$c_u$] + 0.25w[$j_w$]
29:             u[$j_{au}$] ← u[$j_{au}$] + 0.25w[$j_w$]
30:             u[$j_{bu}$] ← u[$j_{bu}$] + 0.25w[$j_w$]
31:         else
32:             u[$j_u$] ← u[$j_u$] + w[$j_w$]
```

-continued

Algorithm 3 Scatter with weights the octant-local values w from octant's primary nodes to the octree-global values u at octant's conforming nodes.

```
33:         end if
34:     end for
35: end procedure
```

Algorithm 4 Scatter with weights the octant-local values w from octant's primary nodes to the octant-local values u at octant's conforming nodes.

```
 1: procedure LOCALSCATTER(octant, w)
 2:     u ← 0
 3:     offset ← OCTANTCHILDOFFSET(octant)
 4:     c ← CHILDNUMBER(offset)            ▷ The node shared with the
                                              octant's parent
 5:     u[c] ← u[c] + w[c]                 ▷ Can not be a
                                              hanging node
 6:     j ← OPPOSITENODE(c)                ▷ The node shared with the
                                              octant's siblings
 7:     u[j] ← u[j] + w[j]                 ▷ Can not be a
                                              hanging node
 8:     for k ← 1, 3 do                    ▷ Check for edge-
                                              hanging nodes
 9:         j ← EDGEHANGINGNODE(c, k)
10:         if NODEHANGING(octant, j) then
11:             u[j] ← u[j] + 0.5w[j]
12:             u[c] ← u[c] + 0.5w[j]
13:         else
14:             u[j] ← u[j] + w[j]
15:         enf if
16:     end for
17:     for k ← 1, 3 do                    ▷ Check for face-
                                              hanging nodes
18:         j ← FACEHANGINGNODE(c, k)
19:         if NODEHANGING(octant, j) then
20:             $j_a$ ← FACEHANGINGNODEA(c, k)
21:             $j_b$ ← FACEHANGINGNODEB(c, k)
22:             u[j] ← u[j] + 0.25w[j]
23:             u[j] ← u[c] + 0.25w[j]
24:             u[$j_a$] ← u[$j_a$] + 0.25w[j]
25:             u[$j_b$] ← u[$j_b$] + 0.25w[j]
26:         else
27:             u[j] ← u[j] + w[j]
28:         end if
29:     end for
30:     return u
31: end procedure
```

Multigrid

Figure 13:
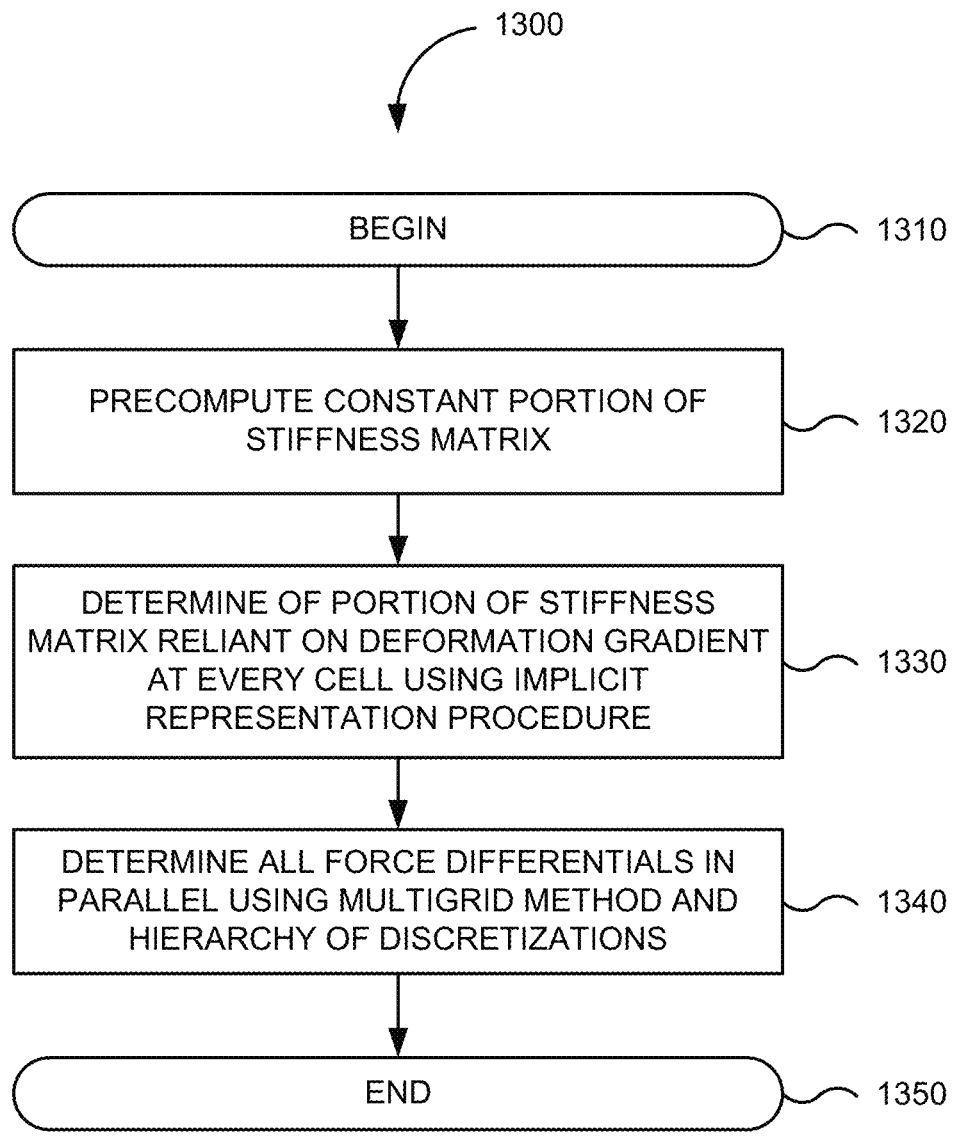
FIG. 13 is a flowchart of a method for solving equations of elasticity using a multigrid method and a matrix free formulation of portions of the stiffness matrix.

In still further embodiments, to ensure that techniques described herein scale to high resolutions, system 100 solves equations of elasticity using a multigrid technique. FIG. 13 is a flowchart of method 1300 for solving equations of elasticity using a multigrid method and a matrix free formulation of portions of the stiffness matrix. Implementations of or processing in method 1300 depicted in FIG. 13 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1300 depicted in FIG. 13 begins in step 1310.

In step 1320, a constant portion of a stiffness matrix is precomputed. For example, system 100 the part $K_A$ of the stiffness matrix due to $\Psi_A$, which is not dependent on positions. In step 1330, a portion of the stiffness matrix reliant on the deformation gradient at every cell is determined using an implicit representation procedure. For example, the auxiliary part $K_{aux}$ due to $\Psi_{aux}$ is fully determined by the discrete deformation gradient $F^e$ at every cell.

Thus, whenever information is required from the stiffness matrix, system 100 obtain the relevant portions either from the precomputed constant portion or via the implicit representation procedure fully determined by the discrete deformation gradient $F^e$ at every cell.

The Jacobi iteration used as the smoother in the multigrid scheme uses the diagonal part $\tilde{d}$ of the stiffness matrix K. A specialized process can be followed to compute the diagonal part directly and efficiently such that system 100 does not explicitly construct this matrix. In some embodiments, the diagonal part $\tilde{d}$ of the stiffness matrix K can be calculated as the combination of multiple components, and specifically as the combination of an auxiliary component and a Laplacian component. The equation for the diagonal part $\tilde{d}$ of the stiffness matrix K as calculated from these components is shown below:

$$\tilde{d} = \tilde{d}_\Delta + \tilde{d}_{aux} \quad (18)$$

In equation (18), $\tilde{d}$ is the diagonal entry of the stiffness matrix K corresponding to the degree of freedom $x_i^{(j)}$, which is the j-th component of the i-th node, $\tilde{d}_\Delta$ represents the Laplacian component of the diagonal part of the stiffness matrix K, and $\tilde{d}_{aux}$ represents the auxiliary component of the diagonal part of the stiffness matrix K.

The Laplacian component $\tilde{d}_\Delta$ can be precomputed. In some embodiments, the Laplacian component $\tilde{d}_\Delta$ depends only on the node i and is the same for every component j. Specifically, the Laplacian component $\tilde{d}_\Delta$ can be computed according to the following equation:

$$\tilde{d}_\Delta = \frac{2\mu V_e}{4h^2} \sum_r \sum_{e_r \in E_r} (w_{k_{er1}} - w_{k_{er0}})^2 \quad (19)$$

In Equation (19), $V_e$ is the volume of the element e, $\mu$ and $\lambda$ are Lamé parameters relating to the stiffness and incompressibility of the material, and h is the length of a side of the element. Further, in Equation (19), $w_{k_{er0}}$ and $w_{k_{er1}}$ are the modified shape functions (to take into account the hanging nodes) evaluated at the nodes $k_{er0}$ and $k_{er1}$. The summation index r ranges over three dimensions, $E_r$ is the set of 4 edges of the element parallel to the r-th coordinate axis, and each edge $e_r$ in set of edges defined by $E_r$, $k_{er0}$ and $k_{er1}$ are the two nodes of that edge $e_r$.

The algorithm for calculation of the Laplacian component on octrees is shown below:

---
Algorithm 5
Laplacian part of the diagonal part of the stiffness matrix on octrees
---

```
1:   procedure DIAGLAPLACIANOCTREE(octant, h, μ)
2:      for i ← 1, 8 do
3:         u ← 0
4:         u[i] ← 1                              ▷ u_k = δ_ik
5:         w ← LOCALGATHER(octant, u)
6:         d ← 0
7:         for r ← 1, 3 do
8:            for k_er0 ← 1, 8 do
9:               b ← 1 << (r - 1)
10:              if ((k_er0 - 1) & b) = 0 then   ▷ ξ^(r) = 0 at node k_er0
11:                 k_er1 ← ((k_er0 - 1)|b) + 1  ▷ ξ^(r) = 1 at node k_er1
12:                 d ← d + (w[k_er1] - w[k_er0])^2
13:              end if
14:           end for
15:        end for
16:        d̃_Δ[i] ← (2μh^3)/(4h^2) d
17:     end for
18:     return d̃_Δ
19:  end procedure
```

Referring again to Equation (19), the auxiliary component $\tilde{d}_{aux}$ can be re-calculated for each iteration of a Newton-Raphson solver. The auxiliary component $\tilde{d}_{aux}$ can be calculated according to the following equation:

$$\tilde{d}_{aux} = V_e(\lambda(r^T\tilde{g})^2 + (\tilde{g} \times r)^T L_{aux}(\tilde{g} \times r)) \quad (20)$$

In this equation, $V_e$ is the volume of the element e and $\lambda$ is a Lamé parameter relating to the stiffness and incompressibility of the material. R is the rotation from the polar decomposition of the deformation gradient, F=RS, where F is the deformation gradient evaluated at the cell center. Further in equation (20), $r^T$ is the j-th row of R. $\tilde{G}$ is the matrix of the derivatives of the modified shape functions (to take into account the hanging nodes) evaluated at the cell center, and $\tilde{g}$ is the i-th column of $\tilde{G}$. The matrix $\tilde{G}$ can be defined by the following equation in which $W_{ik}$ is a matrix representing the local gather operation, which is the transpose of the local scatter operation:

$$\tilde{G}_{jk} = \frac{\partial \tilde{N}_k}{\partial X^{(j)}}\bigg|_{\xi_c} = \sum_i \frac{\partial N_i}{\partial X^{(j)}}\bigg|_{\xi_c} W_{ik} = \sum_i G_{ji} W_{ik}. \quad (21)$$

The algorithm for calculation of the Auxiliary component on octrees is shown below:

---
Algorithm 6 Auxiliary part of the diagonal part of the stiffness matrix on octrees
---

```
1: procedure DIAGAUXOCTREE(octant, h, λ, R, L_aux)
2:                        ▷ Uniform discrete gradient G is precomputed for a unit cube
3:      G̃^T ← LOCALSCATTER(octant, G^T)
4:      for i ← 1,8 do
5:         g̃ ← G̃[·][i]                     ▷ i-th column of G̃
6:         g̃ ← g̃/h                         ▷ Scale from unit cube
7:         for j ← 1,3 do
8:            r ← R[j][·]                    ▷ j-th row of R
9:            n = g̃ × r
10:           d̃_aux[i][j] ← h^3 (λ(r^T g̃)^2 + n^T L_aux n)
11:        end for
12:     end for
13:     return d̃_aux
14: end procedure
```

$L_{aux}$ is defined by the following equation:

$$L_{aux} = \{\lambda tr(S-I) - 2\mu\}\{tr(S)I - S\}^{-1}$$

In some embodiments, $L_{aux}$ can be calculated from the singular value decomposition $F = U\Sigma V^T$ according to the following algorithm:

---

Algorithm 7 Computation of the stress differential corresponding to the auxiliary energy term $\psi_{aux}$. Fixed for definiteness.

---

1: procedure COMPUTEL($\Sigma$, V, $\mu$, $\lambda$, $L_{aux}$)
2:     $L_{Daux} \leftarrow \{\lambda tr(\Sigma - I) - 2\mu\} \{tr(\Sigma)I - \Sigma\}^{-1}$
3:     Clamp diagonal elements of $L_{Daux}$ to a minimum value of $(-\mu)$
4:                                     ▷ Term $\Psi_\Delta$ will boost this eigenvalue by $\mu$
5:     $L_{aux} \leftarrow V L_{Daux} V^T$
6: end procedure
7: procedure DPAUXDEFINITEFIX($\delta F$, R, $L_{aux}$)     ▷ Returns $\delta P_{aux}$
8:     $\delta \hat{F}_{sym} \leftarrow$ SYMMETRICPART($R^T \delta F$)
9:     $\delta \hat{F}_{skew} \leftarrow$ SKEWSYMMETRICPART($R^T \delta F$)
10:    $\delta \hat{P}_{sym,aux} \leftarrow \lambda tr(\delta \hat{F}_{sym}) I$
11:    $\delta \hat{P}_{skew,aux} \leftarrow \epsilon \{L_{aux} (\epsilon : \delta \hat{F}_{skew})\}$
12:    $\delta P_{aux} \leftarrow R (\delta \hat{P}_{sym,aux} + \delta \hat{P}_{skew,aux})$
13:    return $\delta P_{aux}$
14: end procedure

---

Returning again to FIG. 13, in step 1340, all force differentials are determined in parallel using a multigrid method and a hierarchy of discretizations. This may be accomplished using at least one of the two following approaches: the first option is to construct a multigrid cycle purely as a solver for the linear system (8) generated in every Newton-Raphson step. The other possibility is to implement a fully nonlinear multigrid cycle, based on the Full Approximation Scheme (FAS) which would replace and accelerate the entire sequence of Newton iterations.

System 100 provides a discretization based on a voxelized representation of an elastic body. At any given resolution, for example, a background lattice is defined and its cells are labeled either internal or external depending on any material overlap with an embedded deforming body. Internal cells can optionally be labeled as constrained (or Dirichlet) if the trajectories of their nodes will be specified as hard kinematic constraints. The Lamé coefficients $\mu$ and $\lambda$ can be specified for each individual cell, allowing for inhomogeneous models. The coarser domains of a multigrid hierarchy can be generated, for example, by using a simple binary coarsening strategy. Similar to [Zhu et al. 2010], a label of constrained, internal or external is assigned in this order of priority, if fine children with more than one type are present.

In some embodiments, a coarse octree can be generated from a fine octree by looping over all of the fine elements. In such an embodiment, and for each fine octant, a parent octant is computed. If the only descendants of the parent present in the octree are its immediate children, the children can be replaced with the parent. Due to the use of incomplete octrees, not all 8 of the children may be present, which can result in the domain growing as the octree is coarsened. Likewise, the parent is constrained if any the children are constrained. This also results in the constrained region growing as the octree is coarsened.

In some embodiments, and even if the fine octree is 2:1 balanced, the coarse octree may not be and must be balanced again. Balancing may re-introduce some finer octants that were coarsened. Due to the way the domain grows during coarsening, some of the finer octants generated during balancing may not be present in the finer octree. These are removed from the coarse octree after balancing. Likewise, balancing may split some constrained coarse octants, not all of whose children were originally constrained in the fine octree. These reintroduced fine octants have their original constrained state copied back from the fine octree.

The Lamé parameters of coarse interior cells are computed by summing the $\mu$ and $\lambda$ of any interior children, and dividing by eight; thus coarse cells overlapping with the boundary receive lower material parameters, to account for the partial material coverage of the cell.

In general, a multigrid method requires system 100 to generate a hierarchy of discretizations. Specifically, if system 100 uses a multigrid to solve the linear system (8), different versions of K, denoted by $K^h$, $K^{2h}$, $K^{4h}$, need to be computed for every level of the multigrid hierarchy. The Galerkin coarsening strategy is avoided since it requires forming the stiffness matrices explicitly. In several embodiments, system 100 incorporates an alternative matrix-free approach which constructs $K^{2h}$ from a re-discretization at the coarse grid. System 100 can then repeat the same process followed at the fine grid, and define coarse forces $f^{2h} = (x^{2h}) = -\partial \Psi^{2h} / \partial x^{2h}$ as well as a coarse stiffness $K^{2h} = \partial f^{2h} / \partial x^{2h}$ and encode these in a matrix-free fashion as before.

One challenge however is that the entries in $K^{2h}$ depend on the current estimate of the solution and, more accurately, on a coarse grid version $x^{2h}$ of this estimate. The general methodology is to define yet another restriction operator R (possibly different than the R used to restrict residuals) to downsample the solution estimate as $x^{2h} = \hat{R} x^h$. However, as a consequence of the geometric domain coarsening described above, the discrete domain grows in size, as coarse cells with any interior children will now be considered fully interior, even if they include some exterior cells from the fine grid. Therefore, restricting the approximation $x^h$ would require extrapolation of the deformation field. Such extrapolations are usually quite unstable, especially in the presence of collisions, and sometimes even ill-defined near concave, high curvature boundaries.

It has been observed that the entries of K do not depend directly on the positions x, but only through the deformation gradient F. Note that this is also true for the stabilized discretization discussed above; the part $K_A$ of the stiffness matrix due to $\Psi_A$ is a constant matrix, not dependent on positions at all. The auxiliary part $K_{aux}$ due to $\Psi_{aux}$ is fully determined by the discrete deformation gradient $F^e$ at every cell. Thus, instead of restricting $x^h \rightarrow x^{2h}$, system 100 instead downsamples the deformation gradient as $F^h \rightarrow F^{2h}$, which may be done in one example with simple weighted averaging. Once the stiffness matrices have been constructed for all levels, system 100 uses the V-Cycle described in Algorithm 8 to solve the linearized Newton equation. The transfer operators R and P are constructed based on trilinear interpolation. Since system 100 does not explicitly construct K, system 100 use a Jacobi smoother instead of a Gauss-Seidel one, since for the Jacobi procedure all force differentials may be computed in parallel. Note however that the elasticity matrix is not diagonally dominant, and the Jacobi procedure needs to be damped for stable convergence. The inventors have found that the damping coefficient could safely be as high as 0.8 in the interior of the object, while values of 0.3-0.4 were more appropriate near the boundary, near soft constraints, and for higher values of Poisson's ratio.

---
Algorithm 8 Linear Multigrid V(1,1) Cycle for equation (8).
---
1. procedure LinearVCycle
2.    $b^h \leftarrow f^h(x^h) + g^h$
3.    for l = 0 to L−1 do   »total of L+1 levels
4.       Smooth($K^{2^l h}, \delta x^{2^l h}, b^{2^l h}$)
5.       $r^{2^l h} \leftarrow b^{2^l h} - K^{2^l h} \delta x^{2^l h}$
6.       $b^{2^{l+1} h} \leftarrow Restrict(r^{2^l h})$, $\delta x^{2^{l+1} h} \leftarrow 0$
7.    end for
8.    Solve $\delta x^{2^L h} \leftarrow (K^{2^L h})^{-1} b^{2^L h}$
9.    for l = L−1 down to 0 do
10.       $\delta x^{2^l h} \leftarrow \delta x^{2^l h} + Prolongate(\delta x^{2^{l+1} h})$
11.       Smooth($K^{2^l h}, \delta x^{2^l h}, b^{2^l h}$)
12.    end for
13. end function
---

In some aspects, system 100 copies each soft constraint and active collision proxy to the coarse grids based on its material location. System 100 then scales its associated stiffness modulus by a predetermined factor (e.g., 0.125 in 3D or 0.25 in 2D) to accommodate its embedding in a larger element. Otherwise, system 100 treats the coarsened proxies in the same manner at every level of the hierarchy.

In further embodiments, system 100 implements a fully nonlinear multigrid solver, based on the Full Approximation Scheme (FAS) approach. As before, the challenge is that the nonlinear force operator requires a coarse grid version of the solution estimate. Once again, the operator only depends on x through the deformation gradient; unfortunately the deformation gradient does not stay fixed through smoothing and v-cycles, requiring constant updates. System 100 considers the restricted value of the deformation gradient as an "offset" (denoted by $F_{off}$) and changes the state variables for the coarser grids from positions (x) to corrections (u) from this offset. System 100 then computes the updated deformation as $F=F_{off}+G[u]$, where G is the cell-centered gradient operator. The nonlinear forces computed based on this updated gradient are $f^h(F_{off}^h; u^h)$. System 100 incorporates the FAS procedure outlined in Algorithm 8. Damped Jacobi is used, albeit with re-linearization steps inserted between every 2-3 Jacobi iterations.

---
Algorithm 9 FAS V-Cycle for nonlinear equilibrium equation.
---
1. procedure FASVCycle( $f^h(F_{off}^h; u^h) + g^h = 0$ )
2.    NonLinearSmooth( $f^h(F_{off}^h; u^h) + g^h = 0$ )
3.    $F_{off}^{2h} \leftarrow \hat{R}(F_{off}^h + G^h[u^h]), u^{2h} \leftarrow 0$
4.    $g^{2h} \leftarrow - f^{2h}(F_{off}^{2h}; u^{2h}) + R(f^h(F_{off}^h; u^h) + g^h)$
5.    Solve( $f^{2h}(F_{off}^{2h}; u^{2h}) + g^{2h} = 0$ )   »By recursive call
6.    $u^h + = Prolongate(u^{2h})$
7.    NonLinearSmooth( $f^h(F_{off}^h; u^h) + g^h = 0$ )
8. end function
---

FIG. 13 ends in step 1350.

Optimizations

In one aspect, a very significant source of optimization is the choice of initial guess as iterative methods are used. To make solutions deterministic and completely frame independent, use of a base linear blend skin as an initial guess is contemplated. However, this can lead to unstable behavior in the presence of large contact deformations since the way collisions are resolved in general depends on the path taken to the colliding state. Instead, the previous solution (often the previous frame) can be used as an initial guess (and is in some embodiments).

In various embodiments, to improve performance on a CPU, multithreading using a task queue was implemented. Access patterns can be designed to be cache friendly by using blocking techniques. SSE data level parallelism can also be exploited for any SVD computation. Additionally, templatization can be used to optimize stride multiplication computations in array accesses. Constraint contributions to the matrix were baked into a structure that minimized indirection. In further embodiments, since GPUs have become popular for parallel numerical algorithms, all or part of any CPU oriented code to a GPU. Some examples include grid optimization techniques of [Dick et al. 2011b].

Hardware Summary

Figure 14:
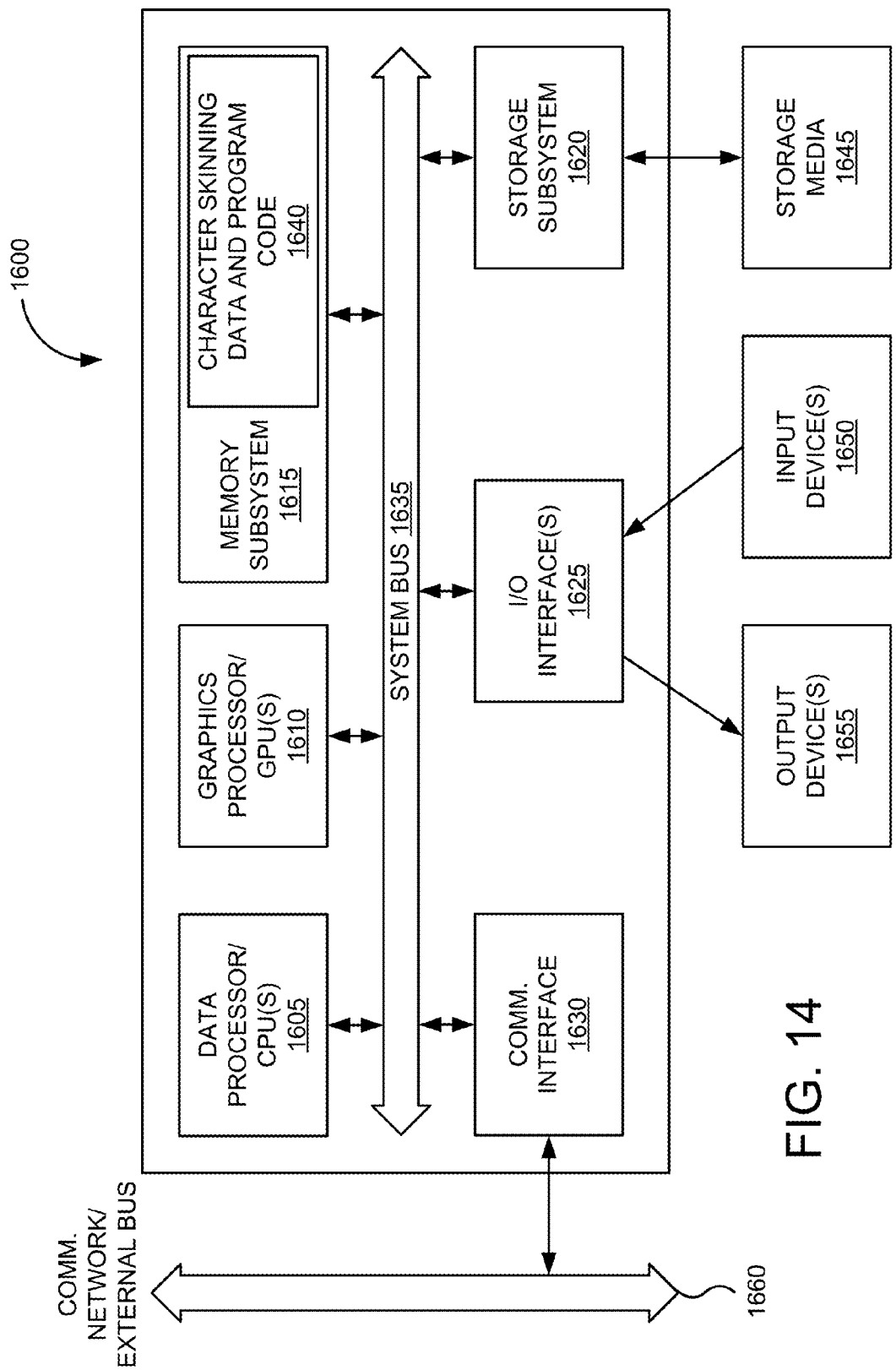
FIG. 14 is a block diagram of a computer system or information processing device that may incorporate an embodiment, be incorporated into an embodiment, or be used to practice any of the innovations, embodiments, and/or examples found within this disclosure.

FIG. 14 is a block diagram of computer system 1600 that may incorporate an embodiment, be incorporated into an embodiment, or be used to practice any of the innovations, embodiments, and/or examples found within this disclosure. FIG. 14 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 1600 can include hardware and/or software elements configured for performing logic operations and calculations, input/output operations, machine communications, or the like. Computer system 1600 may include familiar computer components, such as one or more one or more data processors or central processing units (CPUs) 1605, one or more graphics processors or graphical processing units (GPUs) 1610, memory subsystem 1615, storage subsystem 1620, one or more input/output (I/O) interfaces 1625, communications interface 1630, or the like. Computer system 1600 can include system bus 1635 interconnecting the above components and providing functionality, such connectivity and inter-device communication. Computer system 1600 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 1605 can include hardware and/or software elements configured for executing logic or program code or for providing application-specific functionality. Some examples of CPU(s) 1605 can include one or more microprocessors (e.g., single core and multi-core) or micro-controllers. CPUs 1605 may include 4-bit, 8-bit, 16-bit, 16-bit, 32-bit, 64-bit, or the like architectures with similar or divergent internal and external instruction and data designs. CPUs 1605 may further include a single core or multiple cores. Commercially available processors may include those provided by Intel of Santa Clara, Calif. (e.g., x86, x86_64, PENTIUM, CELERON, CORE, CORE 2, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 1605 may also include one or more field-gate programmable arrays (FPGAs), application-specific integrated circuits (ASICs), or other microcontrollers. The one or more data processors or central processing units (CPUs) 1605 may include any number of registers, logic units, arithmetic units, caches, memory interfaces, or the like. The one or more data processors or central processing units (CPUs) 1605 may further be integrated, irremovably or moveably, into one or more motherboards or daughter boards.

The one or more graphics processor or graphical processing units (GPUs) 1610 can include hardware and/or software elements configured for executing logic or program code associated with graphics or for providing graphics-specific functionality. GPUs 1610 may include any conventional graphics processing unit, such as those provided by conventional video cards. Some examples of GPUs are commercially available from NVIDIA, ATI, and other vendors. In various embodiments, GPUs 1610 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1610 may include any number of registers, logic units, arithmetic units, caches, memory interfaces, or the like. The one or more data processors or central processing units (CPUs) 1605 may further be integrated, irremovably or moveably, into one or more motherboards or daughter boards that include dedicated video memories, frame buffers, or the like.

Memory subsystem 1615 can include hardware and/or software elements configured for storing information. Memory subsystem 1615 may store information using machine-readable articles, information storage devices, or computer-readable storage media. Some examples of these articles used by memory subsystem 1670 can include random access memories (RAM), read-only-memories (ROMS), volatile memories, non-volatile memories, and other semiconductor memories. In various embodiments, memory subsystem 1615 can include character skinning data and program code 1640.

Storage subsystem 1620 can include hardware and/or software elements configured for storing information. Storage subsystem 1620 may store information using machine-readable articles, information storage devices, or computer-readable storage media. Storage subsystem 1620 may store information using storage media 1645. Some examples of storage media 1645 used by storage subsystem 1620 can include floppy disks, hard disks, optical storage media such as CD-ROMS, DVDs and bar codes, removable storage devices, networked storage devices, or the like. In some embodiments, all or part of character skinning data and program code 1640 may be stored using storage subsystem 1620.

In various embodiments, computer system 1600 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 1600 may also include one or more applications configured to execute, perform, or otherwise implement techniques disclosed herein. These applications may be embodied as character skinning data and program code 1640. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1615 and/or storage subsystem 1620.

The one or more input/output (I/O) interfaces 1625 can include hardware and/or software elements configured for performing I/O operations. One or more input devices 1650 and/or one or more output devices 1655 may be communicatively coupled to the one or more I/O interfaces 1625.

The one or more input devices 1650 can include hardware and/or software elements configured for receiving information from one or more sources for computer system 1600. Some examples of the one or more input devices 1650 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1650 may allow a user of computer system 1600 to interact with one or more non-graphical or graphical user interfaces to enter a comment, select objects, icons, text, user interface widgets, or other user interface elements that appear on a monitor/display device via a command, a click of a button, or the like.

The one or more output devices 1655 can include hardware and/or software elements configured for outputting information to one or more destinations for computer system 1600. Some examples of the one or more output devices 1655 can include a printer, a fax, a feedback device for a mouse or joystick, external storage systems, a monitor or other display device, a communications interface appropriately configured as a transceiver, or the like. The one or more output devices 1655 may allow a user of computer system 1600 to view objects, icons, text, user interface widgets, or other user interface elements.

A display device or monitor may be used with computer system 1600 and can include hardware and/or software elements configured for displaying information. Some examples include familiar display devices, such as a television monitor, a cathode ray tube (CRT), a liquid crystal display (LCD), or the like.

Communications interface 1630 can include hardware and/or software elements configured for performing communications operations, including sending and receiving data. Some examples of communications interface 1630 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 1630 may be coupled to communications network/external bus 1680, such as a computer network, to a FireWire bus, a USB hub, or the like. In other embodiments, communications interface 1630 may be physically integrated as hardware on a motherboard or daughter board of computer system 1600, may be implemented as a software program, or the like, or may be implemented as a combination thereof.

In various embodiments, computer system 1600 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1600.

As suggested, FIG. 14 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

CONCLUSION

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

REFERENCE LISTING

BURSTEDDE, C., WILCOX, L., AND GHATTAS, O. 2011. p4est: Scalable algorithms for parallel adaptive mesh refinement on forests of octrees. SIAM Journal on Scientific Computing, 33(3):1103-1133.

CAPELL, S., GREEN, S., CURLESS, B., DUCHAMP, T., AND POPOVIĆ, Z. 2002. Interactive skeleton-driven dynamic deformations. In Proc. SIGGRAPH '02, 586-593.

CAPELL, S., BURKHART, M., CURLESS, B., DUCHAMP, T., AND POPOVIĆ, Z. 2005. Physically based rigging for deformable characters. In Proc. 2005 ACM SIGGRAPH/Eurographics Symp. Comput. Anim.

CHADWICK, J., HAUMANN, D., AND PARENT, E. 1989. Layered construction for deformable animated characters. In Proc. SIGGRAPH '89, 243-252.

CHAO, I., PINKALL, U., SANAN, P., AND SCHRODER, P. 2010. A simple geometric model for elastic deformations. ACM Trans. Graph. 29 (July), 38:1-38:6.

CLUTTERBUCK, S., AND JACOBS, J. 2010. A physically based approach to virtual character deformation. In ACM SIGGRAPH 2010 talks, SIGGRAPH '10.

DICK, C., GEORGII, J., AND WESTERMANN, R. 2011a. A hexahedral multigrid approach for simulating cuts in deformable objects. Visualization and Computer Graphics, IEEE Transactions on, 17(11):1663-1675.

DICK, C., GEORGII, J., AND WESTERMANN, R. 2011b. A realtime multigrid finite hexahedra method for elasticity simulation using CUDA. Sim. Mod. Prac. Th. 19, 2, 801-816.

FLAIG, C. AND ARBENZ, P. 2012 A highly scalable matrix-free multigrid solver for $\mu$FE analysis based on a pointer-less octree. In Ivan Lirkov, Svetozar Margenov, and Jerzy Waniewski, editors, Large-Scale Scientific Computing, volume 7116 of Lecture Notes in Computer Science, pages 498-506. Springer Berlin Heidelberg.

GALOPO, N., OTADUY, M., TEKIN, S., GROSS, M., AND LIN, M. 2007. Soft articulated characters with fast contact handling. Comput. Graph. Forum 26, 243-253.

GEORGII, J., AND WESTERMANN, R. 2006. A multigrid framework for real-time simulation of deformable bodies. Comput. Grap. 30, 3, 408-415.

GEORGII, J., AND WESTERMANN, R. 2010 A streaming approach for sparse matrix products and its application in galerkin multigrid methods. Electronic Transactions on Numerical Analysis, 37:263-275.

GRINSPUN, E., KRYSL, P., AND SCHRÖDER, P. 2002 CHARMS: A simple framework for adaptive simulation. In Proc. SIGGRAPH '02, pages 281-290.

GUPTA, A. K. 1978 A finite element for transition from a fine to a coarse grid. Internat. J. Numer. Methods Engrg., 12(1):35-45.

IRVING, G., KAUTZMAN, R., CAMERON, G., AND CHONG, J. 2008. Simulating the devolved: finite elements on walle. In ACM SIGGRAPH 2008 talks, ACM, New York, N.Y., USA, SIGGRAPH '08, 54:1-54:1.

ISAAC, T., BURSTEDDE, C., AND GHATTAS, O. 2012 Low-cost parallel algorithms for 2:1 octree balance. In Parallel Distributed Processing Symposium (IPDPS), 2012 IEEE 26th International, pages 426-437.

KAVAN, L., COLLINS, S., ŽÁRA, J., AND O'SULLIVAN, C. 2008. Geometric skinning with approximate dual quaternion blending. ACM Trans. Graph. 27, 105:1-105:23.

KRY, P., JAMES, D., AND PAI, D. 2002. Eigenskin: real time large deformation character skinning in hardware. In Proc. ACM SIGGRAPH/Eurographics Symp. Comput. Anim., 153-159.

KRYSL, P., GRINSPUN, E., AND SCHRÖDER, P. 2003. Natural hierarchical refinement for finite element methods. Internat. J. Numer. Methods Engrg., 56(8):1109-1124.

LEWIS, J., CORDNER, M., AND FONG, N. 2000. Pose space deformation: a unified approach to shape interpolation and skeleton-driven deformation. In Proc. SIGGRAPH '00, 165-172.

MAGNENAT-THALMANN, N., LAPERRIÉRE, R., AND THALMANN, D. 1988. Joint-dependent local deformations for hand animation and object grasping. In Proc. Graph. Inter. '88, 26-33.

MATTHIAS, M., AND GROSS, M. 2004. Interactive virtual materials. In Proc. GI '04, 239-246.

MATTHIAS, M., DORSEY, J., MCMILLAN, L., JAGNOW, R., AND CUTLER, B. 2002. Stable real-time deformations. In Proc. 2002 ACM SIGGRAPH/Eurographics Symp. Comput. Anim., 49-54.

MERRY, B., MARAIS, P., AND GAIN, J. 2006. Animation Space: A Truly Linear Framework for Character Animation. ACM Trans. Graph. 25, 1400-1423.

MCADAMS, A., ZHU, Y., SELLE, A., EMPEY, M., TAMSTORF, R., TERAN, J., AND SIFAKIS, E. 2011. Efficient elasticity for character skinning with contact and collisions. ACM Trans. Graph. 30, 4, Article 37 (July 2011), 12 pages.

MÜLLER, M., HEIDELBERGER, B., TESCHNER, M., AND GROSS, M. 2005. Meshless deformations based on shape matching. ACM Trans. Graph. 24, 471-478.

RIVERS, A., AND JAMES, D. 2007. Fastlsm: fast lattice shape matching for robust real-time deformation. ACM Trans. Graph. 26.

SAMPATH, R., ADAVANI, S., SUNDAR, H., LASHUK, I., AND BIROS, G. 2008. Dendro: Parallel algorithms for multigrid and AMR methods on 2:1 balanced octrees. In Proceedings of the 2008 ACM/IEEE Conference on Supercomputing, SC '08, pages 18:1-18:12, Piscataway, N.J., USA SAMPATH, R. AND BIROS, G. 2010. A parallel geometric multigrid method for finite elements on octree meshes. SIAM J. Sci. Comput., 32(3):1361-1392.

SEILER, M., SPILLMANN, J., AND HARDERS, M. 2010. A threefold representation for the adaptive simulation of embedded deformable objects in contact. Journal of WSCG, 18(1-3):89-96.

SIFAKIS, E., SHINAR, T., IRVING, G., AND FEDKIW, R. 2007. Hybrid simulation of deformable solids. In Proc. of ACM SIGGRAPH/Eurographics Symp. on Comput. Anim., 81-90.

SLOAN, P., ROSE, C., AND COHEN, M. 2001. Shape by example. In Proc. 13D '01, 135-143.

SUEDA, S., KAUFMAN, A., AND PAI, D. 2008. Musculotendon simulation for hand animation. ACM Trans. Graph. 27, 3.

SUKUMAR, N. AND MALSCH, E. A. 2006. Recent advances in the construction of polygonal finite element interpolants. Arch. Comput. Methods Eng., 13(1):129-163.

SUNDAR. H., BIROS, G., BURSTEDDE, C., RUDI, J, GHATTAS, O., AND STADLER, G. 2012. Parallel geometric-algebraic multigrid on unstructured forests of octrees. In Proceedings of the International Conference on High Performance Computing, Networking, Storage and Analysis, SC '12, pages 43:1-43:11.

SUNDAR. H., SAMPATH, R., ADAVANI, S., DAVATZIKOS, C., AND BIROS, G. 2007. Low-constant parallel algorithms for finite element simulations using linear octrees. In Proceedings of the 2007 ACM/IEEE Conference on Supercomputing, pages 25:1-25:12.

SUNDAR. H., SAMPATH, R., AND BIROS, G. 2008. Bottom-up construction and 2:1 balance refinement of linear octrees in parallel. SIAM Journal on Scientific Computing, 30(5):2675-2708.

TABARRAEI, A. AND SUKUMAR, N. 2005. Adaptive computations on conforming quadtree meshes. Finite Elem. Anal. Des., 41(7-8):686-702.

TERAN, J., SIFAKIS, E., IRVING, G., AND FEDKIW, R. 2005. Robust quasistatic finite elements and flesh simulation. Proc. of the 2005 ACM SIGGRAPH/Eurographics Symp. on Comput. Anim., 181-190.

TERZOPOULUS, D., AND WATERS, K. 1990. Physically-based facial modeling, analysis and animation. J. Vis. Comput. Anim. 1, 73-80.

TWIGG, C., AND KAČIĆ-ALESIĆ, Z. 2010. Point Cloud Glue: constraining simulations using the procrustes transform. In Proceedings of the 2010 ACM SIGGRAPH/Eurographics Symposium on Computer Animation, Eurographics Association, 45-54.

WANG, C., AND PHILLIPS, C. 2002. Multi-weight enveloping: least-squares approximation techniques for skin animation. In Proc. 2002 ACM SIGGRAPH/Eurographics Symp. Comput. Anim., 169-138.

WANG, W. 2000a. Special bilinear quadrilateral elements for locally refined finite element grids. SIAM J. Sci. Comput., 22(6):2029-2050 (electronic).

WANG, W. 2000b. Special quadratic quadrilateral finite elements for local refinement with irregular nodes. Comput. Methods Appl. Mech. Engrg., 182(1-2):109-134.

WU, X., AND TENDICK, F. 2004. Multigrid integration for interactive deformable body simulation. Med. Sim. 3078, 92-104.

ZHU, Y., SIFAKIS, E., TERAN, J., AND BRANDT, A. 2010. An efficient multigrid method for the simulation of high-resolution elastic solids. ACM Trans. Graph. 29, 16:1-16:18.

What is claimed is:

1. A method for deforming computer-generated objects, the method comprising:
receiving at one or more computer systems, information identifying a computer-generated object;
receiving information identifying a space partitioning tree grid associated with the computer-generated object;

receiving information identifying a set of material properties for the computer generated object;

receiving kinematic information associated with the computer-generated object;

calculating a diagonal component of a stiffness matrix as the combination of an auxiliary component and a Laplacian component;

determining a response of a continuum representation of a material at one or more cells forming the space partitioning tree grid according to the set of material properties and the kinematic information associated with the computer-generated object based on the diagonal component of the stiffness matrix associated with a stabilized energy discretization over the one or more cells of the space partitioning tree grid utilizing a one point quadrature at each of the one or more cells; and generating information configured to deform the computer generated object from a first configuration to a second configuration based on the determined response of the continuum representation of the material.

2. The method of claim 1, wherein the space partitioning tree grid comprises an octree grid.

3. The method of claim 2, wherein the octree grid is formed by a plurality of hexahedral cells having different sizes, and wherein each of the cells forming the octree grid has eight nodes.

4. The method of claim 3, wherein the diagonal component of the stiffness matrix is calculated without generation of the stiffness matrix.

5. The method of claim 4, further comprising storing the information configured to deform the object from the first configuration to the second configuration in a storage device associated with the one or more computer systems.

6. The method of claim 3, wherein determining the response of the continuum representation of a material at one or more of the cells forming the octree grid according to the set of material properties and the kinematic information associated with the computer-generated object based on a calculated diagonal component of a stiffness matrix further comprises:

identifying a first cell of the octree grid having a first size;

identifying a second cell of the octree grid having a second size, wherein the second cell is smaller than the first cell, and wherein the first cell and the second cell are adjacent; and identifying a hanging node of the second cell, wherein the hanging node is at a location on the first cell but not co-located with a node of the first cell.

7. The method of claim 6, further comprising:

identifying a plurality of shape functions, wherein a location of each of the nodes of the second cell are associated with some of the plurality of shape functions;

generating a matrix of a derivative of the some of the shape functions associated with each of the nodes of the second cell;

modifying the some of the shape functions defining the location of the hanging node of the second cell; and generating a modified matrix including a derivative of the modified some of the shape functions.

8. The method of claim 7, wherein modifying the some of the shape functions defining the location of the hanging node of the second cell comprises;

identifying at least one non-hanging node of the first cell adjacent to the hanging node;

determining shape functions of the at least one non-hanging node adjacent to the hanging node; and interpolating the value of the hanging node from the shape functions of the at least one non-hanging node adjacent to the hanging node.

9. The method of claim 8, wherein the diagonal component of the stiffness matrix is calculated with the modified matrix.

10. A non-transitory computer-readable medium storing computer-executable code for deforming computer-generated objects, the non-transitory computer-readable medium comprising:

code for receiving at one or more computer systems, information identifying a computer-generated object;

code for receiving information identifying a space partitioning tree grid associated with the computer-generated object;

code for receiving information identifying a set of material properties for the computer generated object;

code for receiving kinematic information associated with the computer-generated object;

code for calculating a diagonal component of a stiffness matrix as the combination of an auxiliary component and a Laplacian component;

code for determining a response of a continuum representation of a material at one or more cells forming the space partitioning tree grid according to the set of material properties and the kinematic information associated with the computer-generated object based on the diagonal component of the stiffness matrix associated with a stabilized energy discretization over the one or more cells of the space partitioning tree grid utilizing a one point quadrature at each of the one or more cells; and code for generating information configured to deform the first object from a first configuration to a second configuration based on the determined response of the continuum representation of the material.

11. The non-transitory computer-readable medium of claim 10, wherein the space partitioning tree grid comprises an octree grid.

12. The non-transitory computer-readable medium of claim 11, wherein the octree grid is formed by a plurality of hexahedral cells having different sizes, and wherein each of the cells forming the octree grid has eight nodes.

13. The non-transitory computer-readable medium of claim 12, wherein the diagonal component of the stiffness matrix is calculated without generation of the stiffness matrix.

14. The non-transitory computer-readable medium of claim 13, further comprising code for storing the information configured to deform the object from the first configuration to the second configuration in a storage device associated with the one or more computer systems.

15. The non-transitory computer-readable medium of claim 12, wherein determining the response of the continuum representation of a material at one or more of the cells forming the octree grid according to the set of material properties and the kinematic information associated with the computer-generated object based on a calculated diagonal component of a stiffness matrix further comprises:

identifying a first cell of the octree grid having a first size;

identifying a second cell of the octree grid having a second size, wherein the second cell is smaller than the first cell, and wherein the first cell and the second cell are adjacent; and identifying a hanging node of the second cell, wherein the hanging node is at a location on the first cell but not co-located with a node of the first cell.

16. The non-transitory computer-readable medium of claim 15, further comprising:
- code for identifying a plurality of shape functions, wherein a location of each of the nodes of the second cell are associated with some of the plurality of shape functions;
- code for generating a matrix of a derivative of the some of the shape functions associated with each of the nodes of the second cell;
- code for modifying the some of the shape functions defining the location of the hanging node of the second cell; and
- code for generating a modified matrix including a derivative of the modified some of the shape functions.

17. The non-transitory computer-readable medium of claim 16, wherein modifying the some of the shape functions defining the location of the hanging node of the second cell comprises;
- identifying at least one non-hanging node of the first cell adjacent to the hanging node;
- determining shape functions of the at least one non-hanging node adjacent to the hanging node; and
- interpolating the value of the hanging node from the shape functions of the at least one non-hanging node adjacent to the hanging node.

18. The non-transitory computer-readable medium of claim 17, wherein the diagonal component of the stiffness matrix is calculated with the modified matrix.

19. A method for deforming computer-generated objects, the method comprising:
- receiving at one or more computer systems, information identifying a computer-generated object;
- receiving information identifying a space partitioning tree grid associated with the computer-generated object;
- receiving information identifying a set of material properties for the computer generated object;
- receiving kinematic information associated with the computer-generated object;
- determining a response of a continuum representation of a material at one or more cells forming the space partitioning tree grid according to the set of material properties and the kinematic information associated with the computer-generated object based on a diagonal component of a stiffness matrix associated with a stabilized energy discretization over the one or more cells of the space partitioning tree grid utilizing a one point quadrature at each of the one or more cells, wherein the space partitioning tree grid comprises an octree grid formed by a plurality of hexahedral cells having different sizes, and wherein each of the cells forming the octree grid has eight nodes,
- wherein determining the response of the continuum representation of a material at one or more of the cells forming the octree grid according to the set of material properties and the kinematic information associated with the computer-generated object based on a calculated diagonal component of a stiffness matrix further comprises:
  - identifying a first cell of the octree grid having a first size;
  - identifying a second cell of the octree grid having a second size, wherein the second cell is smaller than the first cell, and wherein the first cell and the second cell are adjacent; and
  - identifying a hanging node of the second cell, wherein the hanging node is at a location on the first cell but not co-located with a node of the first cell; and
- generating information configured to deform the computer generated object from a first configuration to a second configuration based on the determined response of the continuum representation of the material.

* * * * *